US010901180B2

(12) United States Patent
Chen et al.

(10) Patent No.: US 10,901,180 B2
(45) Date of Patent: *Jan. 26, 2021

(54) LENS SYSTEM, PROJECTION DEVICE, DETECTING MODULE AND ELECTRONIC DEVICE

(71) Applicant: LARGAN PRECISION CO., LTD., Taichung (TW)

(72) Inventors: Chun-Yen Chen, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,699

(22) Filed: Sep. 26, 2019

(65) Prior Publication Data

US 2020/0026032 A1 Jan. 23, 2020

Related U.S. Application Data

(63) Continuation of application No. 16/007,901, filed on Jun. 13, 2018, now Pat. No. 10,466,442.

(30) Foreign Application Priority Data

Dec. 8, 2017 (TW) .............................. 106143064 A

(51) Int. Cl.
| | | |
|---|---|---|
| *G02B 13/00* | (2006.01) | |
| *G02B 13/18* | (2006.01) | |
| *G02B 9/34* | (2006.01) | |
| *G02B 13/14* | (2006.01) | |

(52) U.S. Cl.
CPC .............. *G02B 13/004* (2013.01); *G02B 9/34* (2013.01); *G02B 13/14* (2013.01); *G02B 13/18* (2013.01)

(58) Field of Classification Search
CPC ........ G02B 9/34; G02B 13/004; G02B 13/14; G02B 13/18
See application file for complete search history.

(56) References Cited

U.S. PATENT DOCUMENTS

| | | | |
|---|---|---|---|
| 4,045,126 | A | 8/1977 | Shoemaker |
| 4,472,034 | A | 9/1984 | Kikuchi |
| 8,014,080 | B1 | 9/2011 | Chen et al. |
| 8,089,704 | B2 | 1/2012 | Tang et al. |
| 8,576,503 | B2 | 11/2013 | Tsai et al. |

(Continued)

FOREIGN PATENT DOCUMENTS

| | | |
|---|---|---|
| CN | 101762863 A | 6/2010 |
| CN | 204389775 U | 6/2015 |

(Continued)

*Primary Examiner* — Michelle M Iacoletti
*Assistant Examiner* — Magda Cruz
(74) *Attorney, Agent, or Firm* — Maschoff Brennan

(57) ABSTRACT

An electronic device includes a lens system including four lens elements. the four lens elements are, in order from an outer side to an inner side, a first lens element, a second lens element, a third lens element and a fourth lens element. The second lens element has negative refractive power. The fourth lens element has positive refractive power. At least one surface of the four lens elements has at least one inflection point. A projection device and a detecting module of the electronic device including the lens system are also disclosed.

31 Claims, 30 Drawing Sheets

(56) References Cited

U.S. PATENT DOCUMENTS

| | | | |
|---|---|---|---|
| 9,316,809 B2 | 4/2016 | Hsu et al. | |
| 9,791,666 B2 | 10/2017 | Hsieh et al. | |
| 10,139,594 B2 | 11/2018 | Lin et al. | |
| 10,409,033 B2 | 9/2019 | Chen et al. | |
| 10,466,442 B2 * | 11/2019 | Chen | G02B 13/18 |
| 2010/0157442 A1 | 6/2010 | Nakagawa | |
| 2012/0182627 A1 * | 7/2012 | Chen | G02B 13/0045 359/714 |
| 2012/0188654 A1 * | 7/2012 | Huang | G02B 9/62 359/713 |
| 2012/0200945 A1 * | 8/2012 | Kubota | G02B 13/004 359/774 |
| 2015/0198784 A1 | 7/2015 | Bone et al. | |
| 2015/0370039 A1 | 12/2015 | Bone | |
| 2016/0306140 A1 * | 10/2016 | Chen | G02B 13/0045 |
| 2016/0377841 A1 * | 12/2016 | Kubota | G02B 9/64 359/755 |
| 2017/0235099 A1 | 8/2017 | Tsai et al. | |
| 2017/0269328 A1 | 9/2017 | Jhang et al. | |
| 2017/0269331 A1 | 9/2017 | Jhang et al. | |
| 2017/0269332 A1 | 9/2017 | Jhang et al. | |
| 2017/0269333 A1 | 9/2017 | Jhang et al. | |
| 2017/0307844 A1 | 10/2017 | Lai et al. | |
| 2017/0307845 A1 | 10/2017 | Lai et al. | |
| 2017/0351062 A1 | 12/2017 | Lai et al. | |
| 2017/0351063 A1 | 12/2017 | Lai et al. | |
| 2018/0321468 A1 | 11/2018 | Shih et al. | |
| 2019/0011668 A1 | 1/2019 | Huang | |
| 2019/0011669 A1 | 1/2019 | Tsai et al. | |
| 2019/0056564 A1 | 2/2019 | Chen et al. | |
| 2019/0056566 A1 | 2/2019 | Yoo et al. | |
| 2019/0137733 A1 | 5/2019 | Gong et al. | |
| 2019/0137734 A1 | 5/2019 | Gong et al. | |

FOREIGN PATENT DOCUMENTS

| | | |
|---|---|---|
| CN | 105425360 A | 3/2016 |
| CN | 105425367 A | 3/2016 |
| CN | 106094163 A | 11/2016 |
| CN | 106094164 A | 11/2016 |
| CN | 106154494 A | 11/2016 |
| CN | 106154515 A | 11/2016 |
| CN | 106970453 A | 7/2017 |
| CN | 206757158 U | 12/2017 |
| CN | 206757159 U | 12/2017 |
| CN | 108107548 A | 6/2018 |
| CN | 108107549 A | 6/2018 |
| CN | 109459834 A | 3/2019 |
| JP | H01-224717 A | 9/1989 |
| JP | 1996-327899 A | 12/1996 |
| JP | 2011-090127 A | 5/2011 |

* cited by examiner

LENS SYSTEM, PROJECTION DEVICE, DETECTING MODULE AND ELECTRONIC DEVICE

RELATED APPLICATIONS

This application is a continuation patent application of U.S. application Ser. No. 16/154,546, filed on Oct. 8, 2018, which is a continuation patent application of U.S. application Ser. No. 16/007,901, filed on Jun. 13, 2018, which claims priority to Taiwan Application 106143064, filed on Dec. 8, 2017, which is incorporated by reference herein in its entirety.

BACKGROUND

Technical Field

The present disclosure relates to a lens system, a projection device, a detecting module and an electronic device, more particularly to a lens system, a projection device and a detecting module applicable to an electronic device.

Description of Related Art

With the popularity of electronic devices having camera functionalities, the demand of miniaturized optical systems has been increasing. A camera capable of detecting three-dimensional (3D) information is favorable for offering depth of field information on top of a two-dimensional (2D) image, thereby providing highly accurate and realistic user experience. When coupled with suitable optical elements or technologies, the camera can further improve the 3D detection speed and resolution, and thus the camera is applicable to augmented reality, face recognition, iris recognition, gesture recognition, 3D modeling and so on.

Currently, the development of human-machine interaction is mostly limited in 2D space. However, there are still some visual differences between 2D image and real objects seen by naked eye. In order to improve the users' immersion or convenience of living, capturing and utilizing 3D information have become an important trend in the development of future technology. The operation of 3D information capture involves projecting light from a light source with specific characteristics onto an object, reflected by the object at different depths, and received by another lens system. The reflected light is analyzed to obtain a distance between the camera and each position of the object at different depths for determining 3D structure of the object, or performing tasks by analyzing the message from the motion of the object. The various applications of 3D image capture and 3D image interaction are numerous, including face recognition systems, motion sensing gaming devices, augmented reality devices, driver assistance systems, smart electronic devices, multi-camera devices, wearable devices, digital cameras, identification systems, entertainment devices, sports devices and smart home systems, etc.

SUMMARY

According to one aspect of the present disclosure, an electronic device includes a lens system including four lens elements. The four lens elements are, in order from an outer side to an inner side: a first lens element, a second lens element, a third lens element and a fourth lens element. The second lens element has negative refractive power. The fourth lens element has positive refractive power. At least one surface of the four lens elements has at least one inflection point. When a focal length of the lens system is f, a focal length of the first lens element is f1, a focal length of the second lens element is f2, a focal length of the third lens element is f3, a focal length of the fourth lens element is f4, a focal length of the i-th lens element is fi, an Abbe number of the first lens element is Vd1, an Abbe number of the second lens element is Vd2, an Abbe number of the third lens element is Vd3, an Abbe number of the fourth lens element is Vd4, an Abbe number of the i-th lens element is Vdi, and an axial distance between the third lens element and the fourth lens element is T34, the following conditions are satisfied:

$3.50 < \Sigma |f/fi|$, wherein $i=1,2,3,4$;

$40.0 < \Sigma Vdi < 150.0$, wherein $i=1,2,3,4$; and $f/T34 < 10.0$.

According to another aspect of the present disclosure, an electronic device includes a projection device including a lens system and at least one light source. The lens system is operated within a wavelength range of 750 nm to 1500 nm. The at least one light source is disposed on a conjugate surface at an inner side of the lens system. The lens system includes four to six lens elements. At least one lens element of the lens system has an Abbe number smaller than 26.0. The lens system includes a first lens element closest to an outer side of the lens system and an inner lens element closest to the inner side of the lens system. When an axial distance between an outer-side surface of the first lens element and an inner-side surface of the inner lens element is TD, the following condition is satisfied:

$1.0 \text{ [mm]} < TD < 5.0 \text{ [mm]}$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
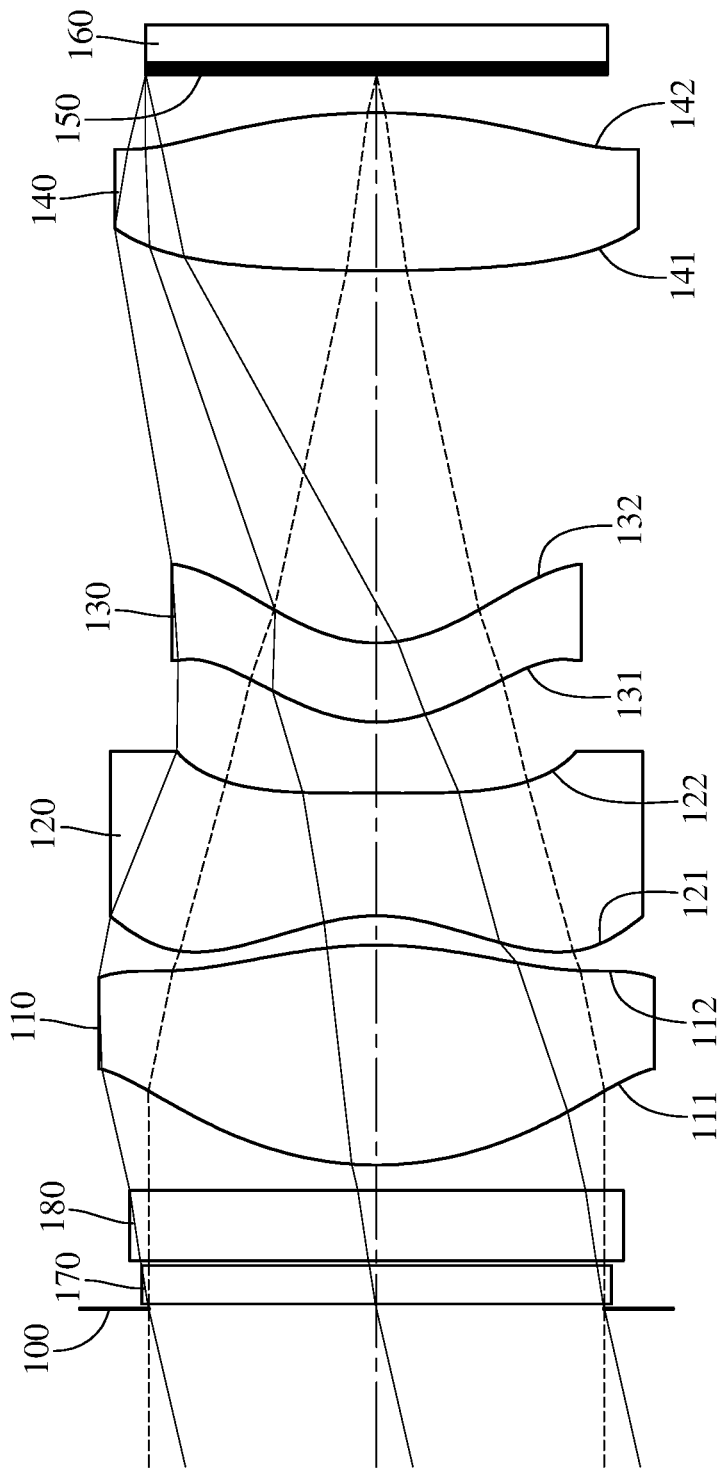
FIG. 1 is a schematic view of a projection device according to the 1st embodiment of the present disclosure.

A lens system includes four lens elements. The four lens elements are, in order from an outer side to an inner side, a first lens element, a second lens element, a third lens element and a fourth lens element. If needed, the lens system can include five or six lens elements; that is, the lens system further includes a fifth lens element and a sixth lens element.

The first lens element can have positive refractive power; therefore, it is favorable for balancing the second lens element with negative refractive power so as to reduce sensitivity of the lens system. The first lens element can have an outer-side surface being convex in a paraxial region thereof; therefore, it is favorable for enhancing the refractive power of the first lens element so as to obtain a proper projection angle.

The second lens element can have negative refractive power. Therefore, it is favorable for correcting aberrations so as to improve optical properties, such as projection and imaging quality of the lens system.

The third lens element can have an outer-side surface being convex in a paraxial region thereof; therefore, it is favorable for correcting astigmatism so as to further improve image quality. The third lens element can have an inner-side surface being concave in a paraxial region thereof; therefore, it is favorable for suppressing the light refraction so as to reduce the chief ray angle.

The fourth lens element can have positive refractive power. Therefore, it is favorable for producing telecentric effect of light traveling to the conjugate surface at the inner side of the lens system so as to enhance illuminance.

According to the present disclosure, among all surfaces of the four lens elements, there can be at least one surface having at least one inflection point, and there can be at least one surface having at least one critical point. Therefore, a lens surface having inflection point or critical point is favorable for improving optical properties of the lens system as well as decreasing the required number of the lens elements so as to reduce the total track length; thus, the lens system is applicable to various electronic devices by satisfying the requirement of compactness. Please refer to FIG. 29, which is a schematic view of inflection points F and critical points C on the surfaces of lens elements, according to the 1st embodiment of the present disclosure.

When a focal length of the lens system is f, a focal length of the first lens element is f1, a focal length of the second lens element is f2, a focal length of the third lens element is f3, a focal length of the fourth lens element is f4, and a focal length of the i-th lens element is fi, the following condition can be satisfied: $3.50<\Sigma|f/fi|$, wherein i=1, 2, 3, 4. Therefore, it is favorable for controlling a sum of the refractive power of every lens element of the lens system so as to balance the distribution of refractive power and reduce the influence of temperature variation on the lens system. Preferably, the following condition can also be satisfied: $4.50<\Sigma|f/fi|<25.0$. More preferably, the following condition can also be satisfied: $6.0<\Sigma|f/fi|<20.0$.

When an Abbe number of the first lens element is Vd1, an Abbe number of the second lens element is Vd2, an Abbe number of the third lens element is Vd3, an Abbe number of the fourth lens element is Vd4, and an Abbe number of the i-th lens element is Vdi, the following condition can be satisfied: $40.0<\Sigma Vdi<150.0$, wherein i=1, 2, 3, 4. Therefore, it is favorable for selecting the material of each lens element so as to enhance illuminance and further improve optical properties of the lens system. Preferably, the following condition can also be satisfied: $40.0<\Sigma Vdi<135.0$. More preferably, the following condition can also be satisfied: $40.0<\Sigma Vdi<120.0$. According to the present disclosure, an Abbe number Vd of a single lens element can be calculated by the following formula: $Vd=(Nd-1)/(NF-NC)$, wherein Nd is a refractive index of the single lens element for helium d-line (587.6 nm), NF is a refractive index of the single lens element for hydrogen F-line (486.1 nm), and NC is a refractive index of the single lens element for hydrogen C-line (656.3 nm).

When the focal length of the lens system is f, and an axial distance between the third lens element and the fourth lens element is T34, the following condition can be satisfied: $f/T34<10.0$. Therefore, it is favorable for producing a telecentric effect at the conjugate surface of the lens system for better image quality while improving lens assembling yield rate.

When an axial distance between the outer-side surface of the first lens element and an inner-side surface of the inner lens element is TD, the following condition can be satisfied: 1.0 [mm]<TD<5.0 [mm]. Therefore, it is favorable for controlling the total track length of the lens system so as to maintain a compact size. When the lens system includes four lens elements, TD is an axial distance between the outer-side surface of the first lens element and an inner-side surface of the fourth lens element. Preferably, the following condition can also be satisfied: 1.0 [mm]<TD<3.80 [mm].

According to the present disclosure, among all lens elements of the lens system, there can be at least one lens element having an Abbe number smaller than 26.0. Therefore, it is favorable for selecting the material of lens element so as to enhance illuminance. Preferably, there can be at least one lens element having the Abbe number smaller than 22.0; alternatively, there can be at least two lens elements with each of them having an Abbe number smaller than 26.0. More preferably, there can be at least three lens elements with each of them having an Abbe number smaller than 26.0.

According to the present disclosure, the lens system can be operated with light having a wavelength range of 750 nanometers (nm) to 1500 nm. Therefore, a proper wavelength range of the lens system for imaging is favorable for avoiding disturbance from the background noise so as to obtain proper detecting efficiency of the image sensor.

When a curvature radius of the outer-side surface of the third lens element is R5, and a maximum effective radius of the outer-side surface of the third lens element is Y31, the following condition can be satisfied: |R5/Y31|<2.0. Therefore, it is favorable for controlling a shape of the outer-side surface of the third lens element so as to obtain a balance between compactness and good image quality. Preferably, the following condition can also be satisfied: |R5/Y31|<1.50.

When a central thickness of the first lens element 110 is CT1, a central thickness of the second lens element is CT2, a central thickness of the third lens element is CT3, a central thickness of the fourth lens element is CT4, and a central thickness of the i-th lens element is CTi, the following condition can be satisfied: 1.0 [mm]<ΣCTi<2.50 [mm], wherein i=1, 2, 3, 4. Therefore, it is favorable for reducing the total track length so as to keep the lens system compact.

When a maximum effective radius of the inner-side surface of the fourth lens element is Y42, and an entrance pupil diameter of the lens system is EPD, the following condition can be satisfied: 0.10<(Y42×2)/EPD<1.20. Therefore, it is favorable for reducing the incident angle of light on the conjugate surface at the inner side so as to enhance illuminance and improve optical properties.

When a maximum value among all refractive indices of the lens system is Nmax, the following condition can be satisfied: 1.50<Nmax<1.70. Therefore, it is favorable for selecting the material of lens element so as to reduce manufacturing costs and achieve compactness.

When an axial distance between the inner-side surface of the fourth lens element and the conjugate surface is BL, and the focal length of the lens system is f, the following condition can be satisfied: 0.01<BL/f<0.50. Therefore, it is favorable for providing a compact configuration featuring sufficient illuminance. Preferably, the following condition can also be satisfied: 0.01<BL/f<0.15.

When a maximum effective radius of the outer-side surface of the first lens element is Y11, and the maximum effective radius of the inner-side surface of the fourth lens element is Y42, the following condition can be satisfied: 0.10<Y42/Y11<2.0. Therefore, it is favorable for improving lens assembling yield rate, enlarging the field of light and maintaining the intensity of light beams. Preferably, the following condition can also be satisfied: 0.30<Y42/Y11<1.0.

When a maximum value among all maximum effective radii of all surfaces of the lens system is Ymax, the following condition can be satisfied: 0.1 [mm]<Ymax<1.80 [mm]. Therefore, it is favorable for maintaining the compact size of the lens system.

Figure 29:
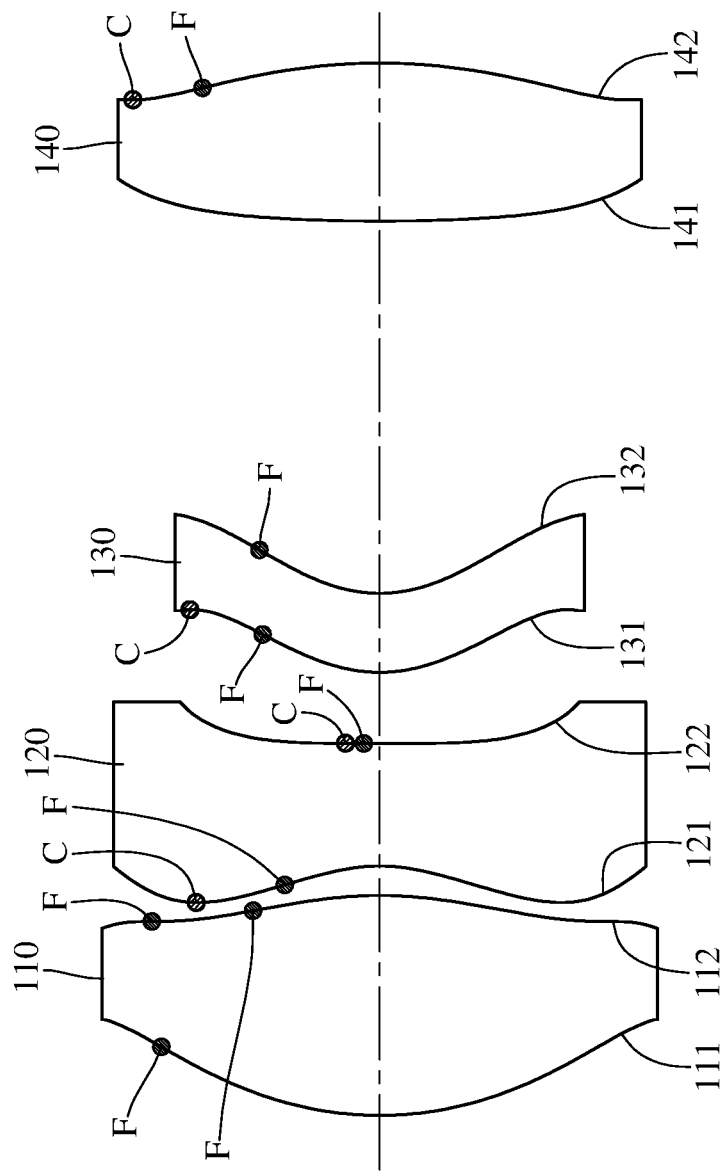
FIG. 29 is a schematic view of inflection points and critical points on the surfaces of lens elements, according to the 1st embodiment of the present disclosure.

When a vertical distance between an inflection point closest to an optical axis on any surface of the second lens element and the optical axis is Yp2x, a vertical distance between the inflection point closest to the optical axis on an outer-side surface of the second lens element and the optical axis is Yp21, a vertical distance between the inflection point closest to the optical axis on an inner-side surface of the second lens element and the optical axis is Yp22, and the focal length of the lens system is f, the following condition can be satisfied: 0.01<Yp2x/f<1.0, wherein x=1 or 2. Therefore, it is favorable for correcting aberrations so as to further improve optical properties. Preferably, the following condition can also be satisfied: 0.01<Yp2x/f<0.50. FIG. 29 shows the inflection points F on the surfaces of the second lens element according to the 1st embodiment of the present disclosure.

According to the present disclosure, at least half of all lens elements of the lens system can be made of plastic material, and all surfaces (outer-side surfaces and inner-side surfaces) of the plastic lens elements can be aspheric. Therefore, the material of lens element is proper for reducing costs and achieving compactness.

When a temperature coefficient of refractive index of each aforementioned plastic lens element is dn/dt, the following condition can be satisfied: $-150 \times 10^{-6} < dn/dt < -50 \times 10^{-6}$ [1/° C.]. Therefore, it is favorable for adjusting the material of lens element so as to keep the lens system compact and reduce manufacturing costs at various ambient temperatures.

According to the present disclosure, a sum of central thicknesses of all lens elements of the lens system can range from 0.50 mm to 3.0 mm. Therefore, it is favorable for reducing the total track length so as to maintain compactness.

Figure 30:
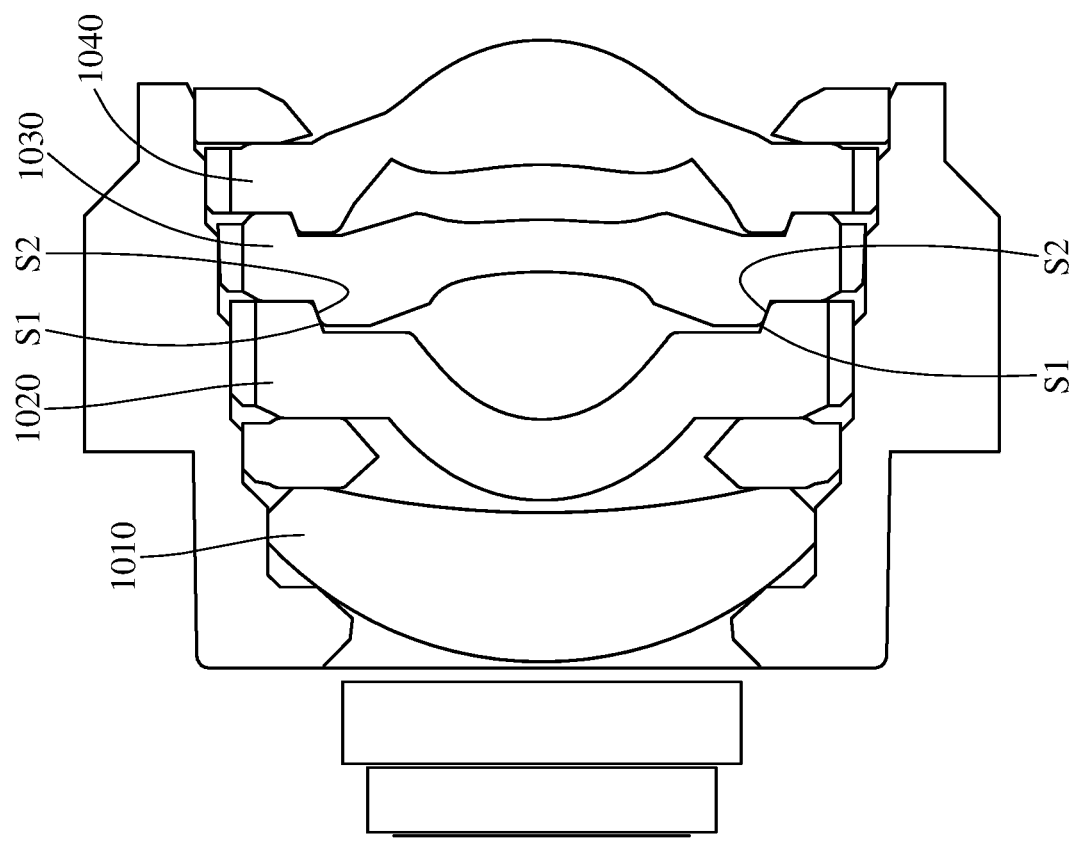
FIG. 30 is a schematic view of fitting structure disposed between every adjacent lens element according to the 10th embodiment of the present disclosure.

According to the present disclosure, there can be at least one fitting structure disposed between every adjacent lens element of the lens system. Therefore, it is favorable for providing proper concentricity between every adjacent lens element so as to correct aberrations due to a decentered lens element, thereby further improving image quality. Please refer to FIG. 30, which is a schematic view of fitting structure disposed between every adjacent lens element according to the 10th embodiment of the present disclosure. For example, when an fitting structure is disposed between the second lens element and the third lens element, the second lens element typically includes a first axial assembling surface S1, and the third lens element includes a second axial assembling surface S2 corresponding to the first axial assembling surface S1. The first axial assembling surface S1 and the second axial assembling surface S2 can be assembled together to align the centers of the second lens element and the third lens element with each other, thereby obtaining high concentricity to reduce aberrations generated by the decentered lens element.

According to the present disclosure, the lens system can be installed in a projection device, and the projection device can include at least one light source. The light source can be a vertical-cavity surface-emitting laser (VCSEL) so that it is favorable for providing a lens system with a light source featuring high directionality, low divergence and high intensity, thereby enhancing the illuminance of a projection surface.

According to the present disclosure, the projection device can include at least one diffractive optical element, and the diffractive optical element can be disposed on the outer side of the first lens element. Therefore, it is favorable for diffracting light to increase the angle of projection, thereby enlarging the projection area.

According to the present disclosure, the projection device can be installed in an electronic device, and the electronic device can be a portable communication device such as a smartphone. Therefore, 3D detection, such as gesture recognition, face recognition and augmented reality, can be introduced in the portable communication device for new user experience, thereby accomplishing realistic and natural human-machine interaction.

According to the present disclosure, the aforementioned features and conditions can be utilized in numerous combinations so as to achieve corresponding effects.

According to the present disclosure, the lens elements of the lens system can be made of either glass or plastic material. When the lens elements are made of glass material, the refractive power distribution of the lens system may be more flexible. The glass lens element can either be made by grinding or molding. When the lens elements are made of plastic material, the manufacturing cost can be effectively reduced. Furthermore, surfaces of each lens element can be arranged to be aspheric, which allows for more controllable variables for eliminating the aberration thereof, the required number of the lens elements can be decreased, and the total track length of the lens system can be effectively reduced. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an outer-side surface and an inner-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, every parameter of the lens system, the projection device, the detecting module and the electronic device, unless specifically defined, is determined according to an operating wavelength. For example, when the operating wavelength is visible light (e.g., a wavelength mainly in the range of 350-750 nm), every parameter is determined and calculated according to d-line. When the operating wavelength is near infrared light (e.g., a wavelength mainly in the range of 750-1500 nm), every parameter is determined and calculated according to the wavelength of 940 nm.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the lens system can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between a detected object and the first lens element can provide a longer distance between an exit pupil of the lens system and the conjugate surface to produce a telecentric effect, and thereby reducing the chief ray angle. A middle stop disposed between the first lens element and the conjugate surface is favorable for enlarging the viewing angle of the lens system and thereby provides a wider field of view for the same.

Figure 23:
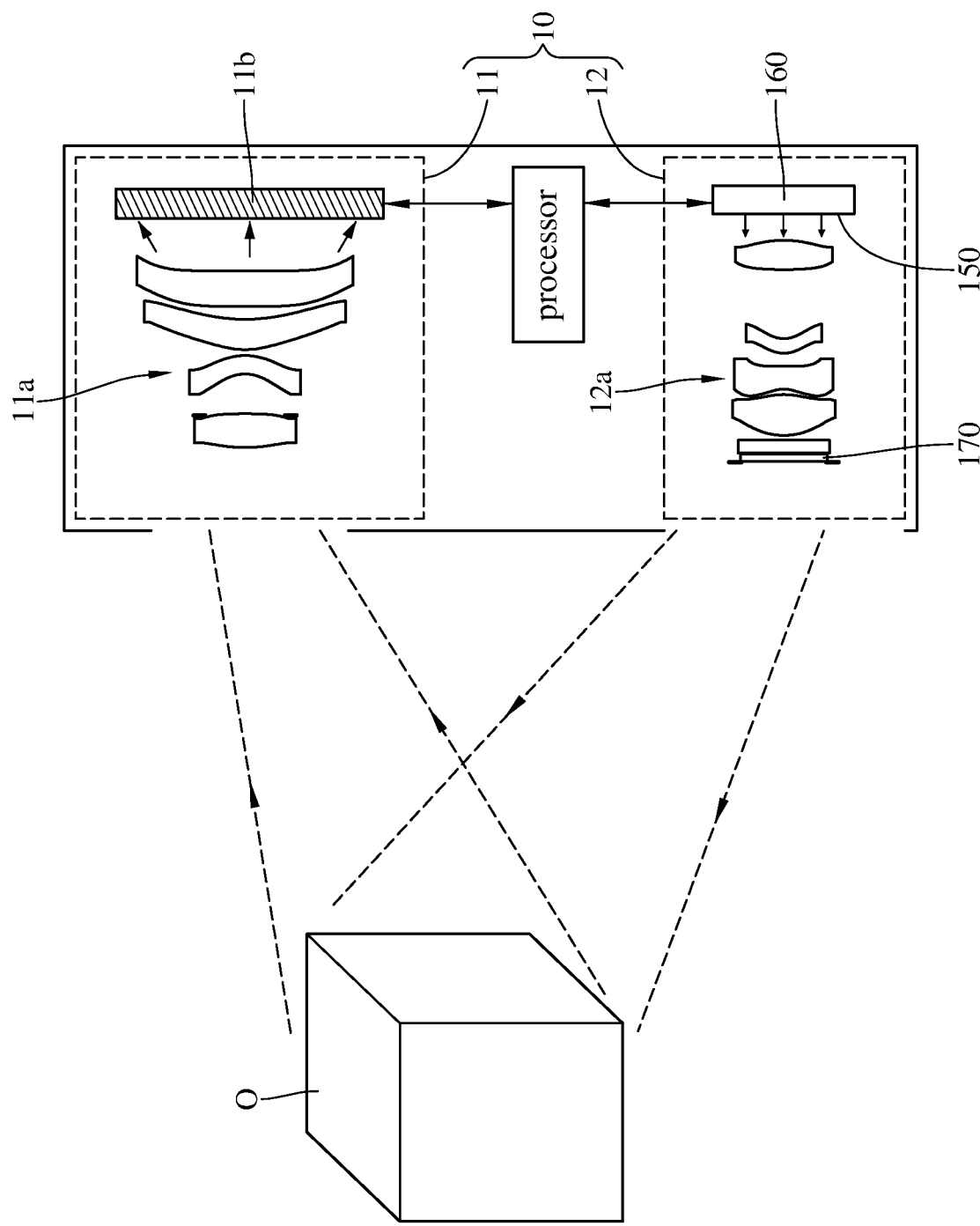
FIG. 23 is a schematic view of a detecting module according to the 12th embodiment of the present disclosure.

According to the present disclosure, an outer side indicates the outside of a mechanism, and an inner side indicates the inside of the mechanism. FIG. 23 is a schematic view of an imaging lens assembly 11a of a receiving device 11 and a lens system 12a of a projection device 12, according to an exemplary embodiment of the present disclosure. The lens system 12a includes a conjugate surface 150 on the inner side, which means that the conjugate surface 150 is a focal plane located on the inside of the mechanism (the conjugate surface on a reducing side). The imaging lens assembly 11a includes an image surface on the inner side, which means that the image surface is a focal plane located on the inside of the mechanism. As for the imaging lens assembly 11a, the outer side of the imaging lens assembly 11a is an object side of the imaging lens assembly 11a, and the inner side of the imaging lens assembly 11a is an image side of the imaging lens assembly 11a. As for the lens system 12a of the projection device 12, the outer side of the lens system 12a is a magnifying side of the lens system 12a close to a detected object O, and a light emitting surface is on the outer side; the inner side of the lens system 12a is a reducing side of the lens system 12a close to a light source 160, and a light receiving surface is on the inner side. As for lens elements of the lens system 12a, the outer side of any lens element thereof is a side of the lens element close to the detected object O, and an outer-side surface of the lens element is a lens surface facing toward the detected object O; the inner side of the lens element is another side of the lens element close to the light source 160 (or the conjugate surface 150), and an inner-side surface of the lens element is a lens surface facing toward the light source 160.

According to the above description of the present disclosure, the following specific embodiments are provided for further explanation.

1st Embodiment

Figure 2:
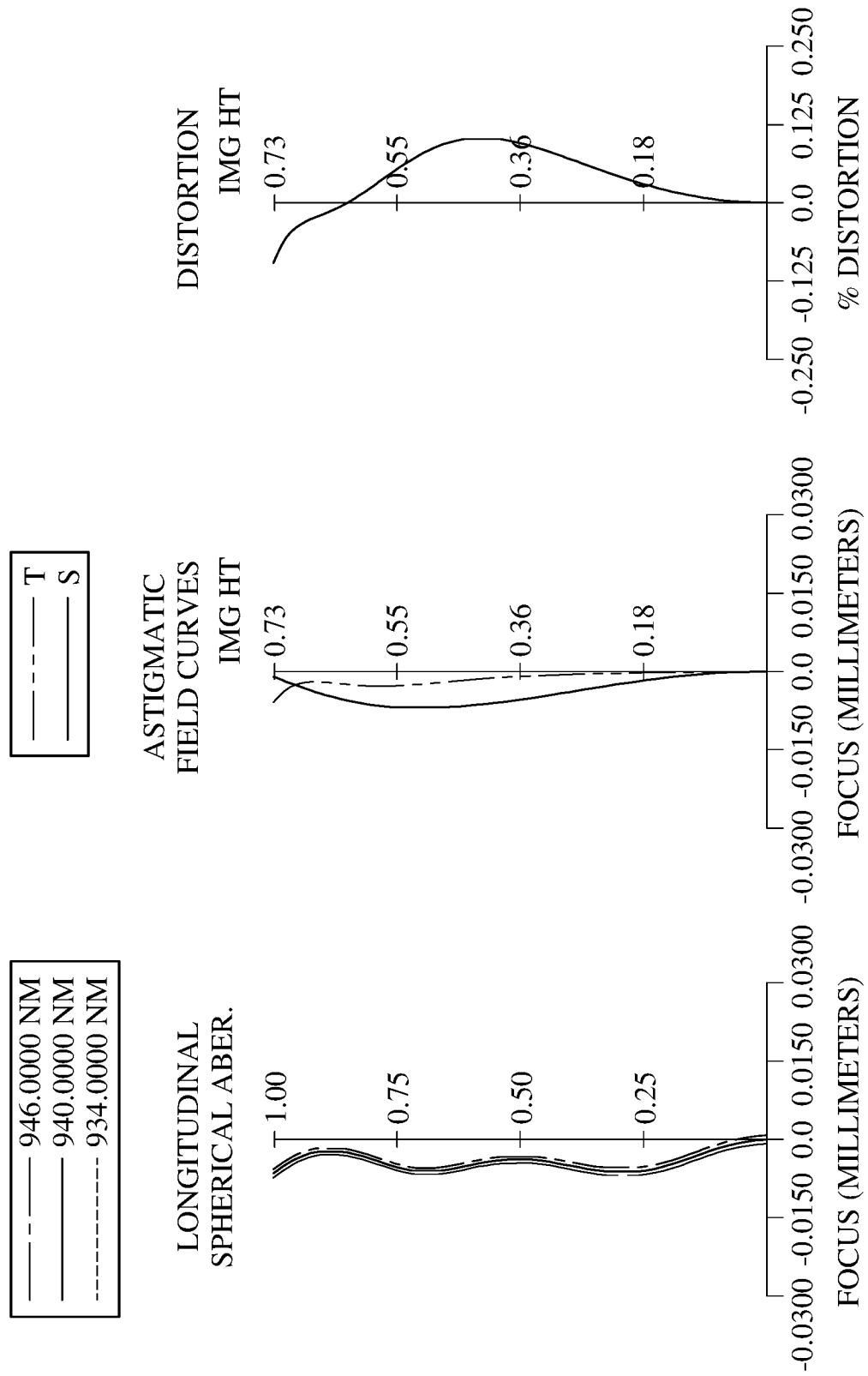
FIG. 2 shows spherical aberration curves, astigmatic field curves and a distortion curve of the projection device according to the 1st embodiment.

FIG. 1 is a schematic view of a projection device according to the 1st embodiment of the present disclosure. FIG. 2 shows, in order from left to right, spherical aberration curves, astigmatic field curves and a distortion curve of the projection device according to the 1st embodiment. In FIG. 1, the projection device includes a lens system (its reference numeral is omitted) of the present disclosure, a light source 160, a diffractive optical element (DOE) 170 and a cover glass 180. The lens system includes, in order from an outer side to an inner side, an aperture stop 100, a first lens element 110, a second lens element 120, a third lens element 130, a fourth lens element 140 and a conjugate surface 150. The lens system includes four lens elements (110, 120, 130 and 140) with no additional lens element disposed between each of the adjacent four lens elements.

The first lens element 110 with positive refractive power has an outer-side surface 111 being convex in a paraxial region thereof and an inner-side surface 112 being convex in a paraxial region thereof. The first lens element 110 is made of plastic material and has the outer-side surface 111 and the inner-side surface 112 being both aspheric. Each of the outer-side surface 111 and the inner-side surface 112 of the first lens element 110 has at least one inflection point.

The second lens element 120 with negative refractive power has an outer-side surface 121 being concave in a paraxial region thereof and an inner-side surface 122 being convex in a paraxial region thereof. The second lens element 120 is made of plastic material and has the outer-side surface 121 and the inner-side surface 122 being both aspheric. Each of the outer-side surface 121 and the inner-side surface 122 of the second lens element 120 has at least one inflection point. Each of the outer-side surface 121 and the inner-side surface 122 of the second lens element 120 has at least one critical point.

The third lens element 130 with positive refractive power has an outer-side surface 131 being convex in a paraxial region thereof and an inner-side surface 132 being concave in a paraxial region thereof. The third lens element 130 is made of plastic material and has the outer-side surface 131 and the inner-side surface 132 being both aspheric. Each of the outer-side surface 131 and the inner-side surface 132 of the third lens element 130 has at least one inflection point. The outer-side surface 131 of the third lens element 130 has at least one critical point.

The fourth lens element 140 with positive refractive power has an outer-side surface 141 being convex in a paraxial region thereof and an inner-side surface 142 being convex in a paraxial region thereof. The fourth lens element 140 is made of plastic material and has the outer-side surface 141 and the inner-side surface 142 being both aspheric. The inner-side surface 142 of the fourth lens element 140 has at least one inflection point and at least one critical point.

The light source 160 is disposed on or near the conjugate surface 150 of the lens system. The diffractive optical element 170 is made of silica. The diffractive optical element 170 and the cover glass 180 are located between the aperture stop 100 and the outer-side surface 111 of the first lens element 110, and will not affect the focal length of the lens system.

The equation of the aspheric surface profiles of the aforementioned lens elements of the 1st embodiment is expressed as follows:

$$X(Y) = (Y^2/r)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the lens system of the projection device according to the 1st embodiment, when a focal length of the lens system is f, an f-number of the lens system is Fno, and half of a maximum field of view of the lens system is HFOV, these parameters have the following values: f=3.18 millimeters (mm), Fno=2.21, HFOV=13.0 degrees (deg.).

In this embodiment, the lens system is operated within an optical spectrum having a center wavelength of λ nm, and the following condition is satisfied: λ=940 nm.

When a maximum value among all refractive indices of the lens system is Nmax, the following condition is satisfied: Nmax=1.634. In this embodiment, the refractive index of the second lens element 120 is larger than the refractive indices of the first lens element 110, the third lens element 130 and the fourth lens element 140, and thus Nmax is equal to the refractive index of the second lens element 120.

When an Abbe number of the first lens element 110 is Vd1, an Abbe number of the second lens element 120 is Vd2, an Abbe number of the third lens element 130 is Vd3, an Abbe number of the fourth lens element 140 is Vd4, and an Abbe number of the i-th lens element is Vdi, the following condition is satisfied: ΣVdi=91.4, wherein i=1, 2, 3, 4.

When a central thickness of the first lens element 110 is CT1, a central thickness of the second lens element 120 is CT2, a central thickness of the third lens element 130 is CT3, a central thickness of the fourth lens element 140 is CT4, and a central thickness of the i-th lens element is CTi, the following condition is satisfied: ΣCTi=1.83 mm, wherein i=1, 2, 3, 4.

When an axial distance between an outer-side surface of an outer lens element closest to the outer side of the lens system and an inner-side surface of an inner lens element closest to the inner side of the lens system is TD, the following condition is satisfied: TD=3.33 mm. In this embodiment, the first lens element 110, which is the closest lens element to the outer side, is interpret as the outer lens element, and the fourth lens element 140, which is the closest lens element to the inner side, is interpret as the inner lens element. Thus, TD is equal to an axial distance between the outer-side surface 111 of the first lens element 110 and the inner-side surface 142 of the fourth lens element 140.

When a maximum value among all maximum effective radii of all surfaces of the lens system is Ymax, the following condition is satisfied: Ymax=0.88 mm. In this embodiment, a maximum effective radius of the inner-side surface 112 of the first lens element 110 is larger than maximum effective radii of the other surfaces (111, 121, 122, 131, 132, 141 and 142), and thus Ymax is equal to the maximum effective radius of the inner-side surface 112 of the first lens element 110.

When the focal length of the lens system is f, a focal length of the first lens element 110 is f1, a focal length of the second lens element 120 is f2, a focal length of the third lens element 130 is f3, a focal length of the fourth lens element 140 is f4, and a focal length of the i-th lens element is fi, the following condition is satisfied: Σ|f/fi|=8.35, wherein i=1, 2, 3, 4.

When the focal length of the lens system is f, and an axial distance between the third lens element 130 and the fourth lens element 140 is T34, the following condition is satisfied: f/T34=2.70. In this embodiment, an axial distance between two adjacent lens elements is an air gap in a paraxial region between the two adjacent lens elements.

When an axial distance between the inner-side surface 142 of the fourth lens element 140 and the conjugate surface 150 is BL, and the focal length of the lens system is f, the following condition is satisfied: BL/f=0.04.

When a curvature radius of the outer-side surface 131 of the third lens element 130 is R5, and the maximum effective radius of the outer-side surface 131 of the third lens element 130 is Y31, the following condition is satisfied: |R5/Y31|=0.76.

When the maximum effective radius of the outer-side surface 111 of the first lens element 110 is Y11, and the maximum effective radius of the inner-side surface 142 of the fourth lens element 140 is Y42, the following condition is satisfied: Y42/Y11=0.91.

When the maximum effective radius of the inner-side surface 142 of the fourth lens element 140 is Y42, and an entrance pupil diameter of the lens system is EPD, the following condition is satisfied: (Y42×2)/EPD=1.09.

When a vertical distance between the inflection point closest to an optical axis on the outer-side surface 121 of the second lens element 120 and the optical axis is Yp21, and the focal length of the lens system is f, the following condition is satisfied: Yp21/f=0.09.

When a vertical distance between the inflection point closest to the optical axis on the inner-side surface 122 of the second lens element 120 and the optical axis is Yp22, and the focal length of the lens system is f, the following condition is satisfied: Yp22/f=0.02.

The detailed optical data of the 1st embodiment are shown in Table 1 and the aspheric surface data are shown in Table 2 below.

TABLE 1

1st Embodiment
f = 3.18 mm, Fno = 2.21, HFOV = 13.0 deg.

| Surface # | Curvature Radius | Thickness | Material | Index | Abbe # | Focal Length | dn/dt × $10^{-6}$ |
|---|---|---|---|---|---|---|---|
| 0 | Object | Plano | 500.000 | | | | |
| 1 | Ape. Stop | Plano | 0.015 | | | | |
| 2 | DOE | Plano | 0.122 | Silica | 1.451 | 67.8 | — | — |
| 3 | | Plano | 0.015 | | | | |
| 4 | Cover Glass | Plano | 0.223 | Glass | 1.508 | 64.2 | — | — |
| 5 | | Plano | 0.080 | | | | |
| 6 | Lens 1 | 1.100 (ASP) | 0.696 | Plastic | 1.594 | 26.0 | 1.11 | −118.8 |
| 7 | | −1.245 (ASP) | 0.093 | | | | |
| 8 | Lens 2 | −0.558 (ASP) | 0.388 | Plastic | 1.634 | 20.4 | −0.90 | −117.0 |
| 9 | | −39.375 (ASP) | 0.225 | | | | |
| 10 | Lens 3 | 0.476 (ASP) | 0.250 | Plastic | 1.626 | 21.5 | 5.19 | −117.5 |
| 11 | | 0.445 (ASP) | 1.178 | | | | |
| 12 | Lens 4 | 6.343 (ASP) | 0.500 | Plastic | 1.617 | 23.5 | 2.40 | −110.0 |
| 13 | | −1.878 (ASP) | 0.120 | | | | |
| 14 | Light Source | Plano | — | | | | |

Note:
Reference wavelength is 940.0 nm.

TABLE 2

Aspheric Coefficients

| Surface # | 6 | 7 | 8 | 9 |
|---|---|---|---|---|
| k= | −1.2550E+00 | −9.4133E+00 | −5.2864E+00 | −6.9336E+01 |
| A4= | 8.3890E−02 | 4.1217E−01 | 7.5428E−01 | 8.6610E−01 |
| A6= | −1.1837E−01 | −1.8862E+00 | −1.7874E+00 | −9.9840E−01 |
| A8= | 1.5791E−01 | 6.2597E+00 | 5.4005E+00 | 4.0762E+00 |
| A10= | −4.3886E−01 | −8.3209E+00 | −6.0933E+00 | −1.1490E+01 |
| A12= | 1.7287E−01 | 3.6144E+00 | 2.2067E+00 | 1.8711E+01 |

| Surface # | 10 | 11 | 12 | 13 |
|---|---|---|---|---|
| k= | −1.9982E+00 | −1.2984E+00 | −6.6800E−02 | 9.0338E−01 |
| A4= | −1.9367E−01 | −6.3328E−01 | 4.1909E−02 | 5.8638E−03 |
| A6= | −9.0397E−01 | −1.2684E+00 | 2.1292E−01 | 4.0553E−01 |
| A8= | −4.1163E+00 | −2.3361E+00 | −1.2023E−01 | −7.4961E−01 |
| A10= | 1.0128E+01 | 1.7356E+01 | 8.3341E−02 | 1.0856E+00 |
| A12= | −7.6227E+00 | −2.0594E+01 | 5.7220E−02 | −3.7741E−01 |

In Table 1, the curvature radius, the thickness and the focal length are shown in millimeters (mm). Surface numbers 0-14 represent the surfaces sequentially arranged from the outer side to the inner side along the optical axis. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
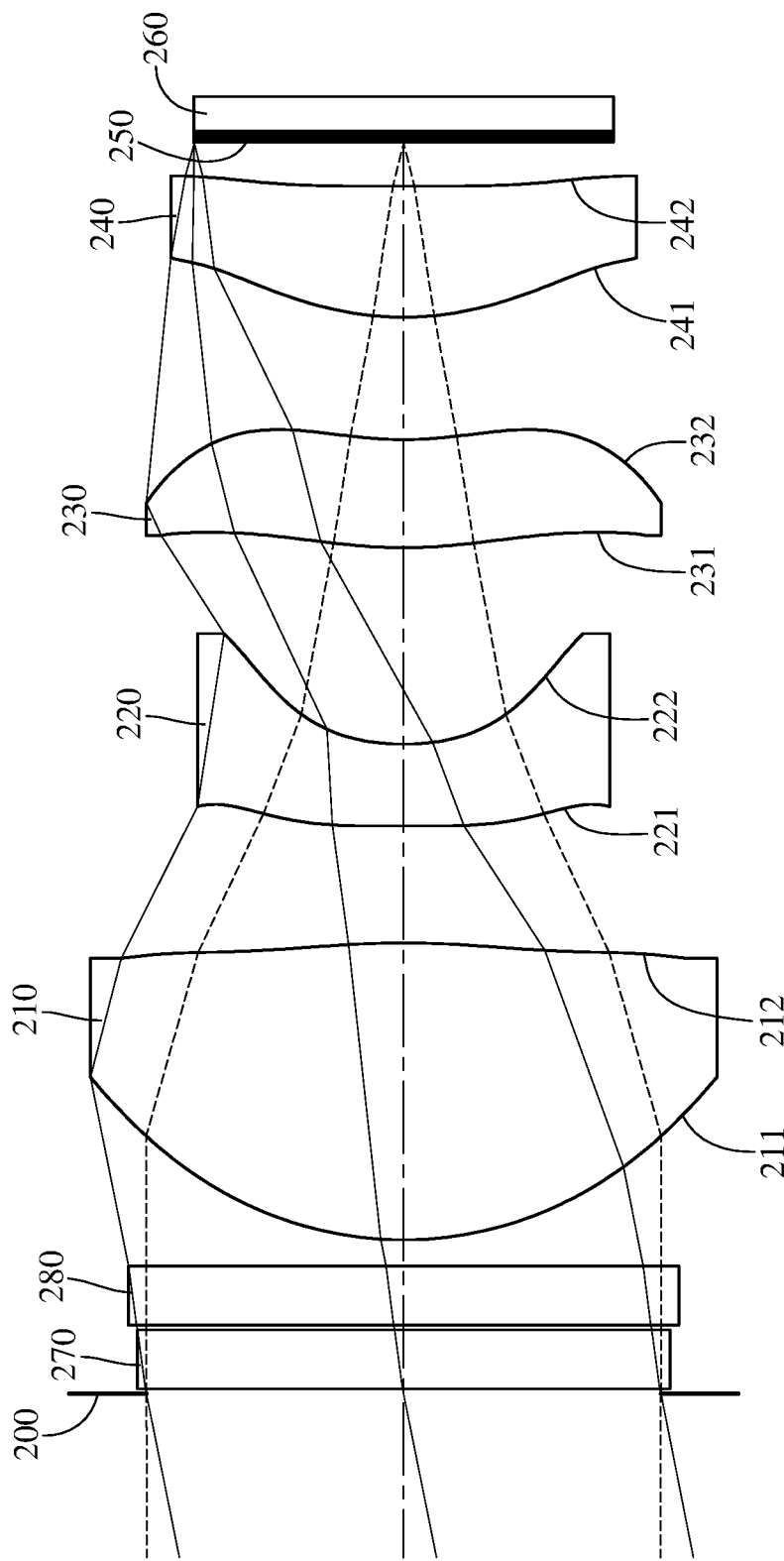
FIG. 3 is a schematic view of a projection device according to the 2nd embodiment of the present disclosure.
Figure 4:
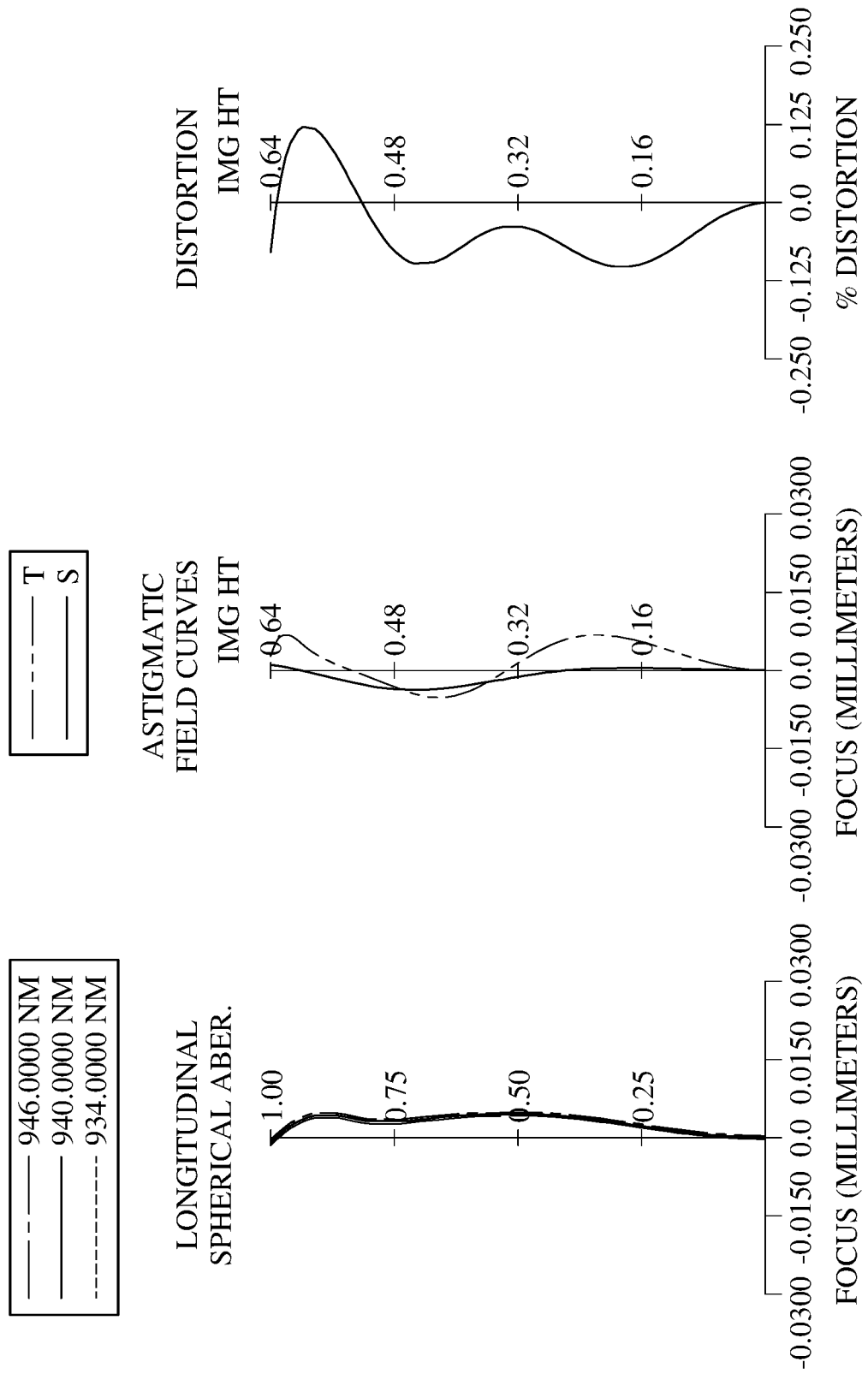
FIG. 4 shows spherical aberration curves, astigmatic field curves and a distortion curve of the projection device according to the 2nd embodiment.

FIG. 3 is a schematic view of a projection device according to the 2nd embodiment of the present disclosure. FIG. 4 shows, in order from left to right, spherical aberration curves, astigmatic field curves and a distortion curve of the projection device according to the 2nd embodiment. In FIG. 3, the projection device includes a lens system (its reference numeral is omitted) of the present disclosure, a light source 260, a diffractive optical element 270 and a cover glass 280. The lens system includes, in order from an outer side to an inner side, an aperture stop 200, a first lens element 210, a second lens element 220, a third lens element 230, a fourth lens element 240 and a conjugate surface 250. The lens system includes four lens elements (210, 220, 230 and 240) with no additional lens element disposed between each of the adjacent four lens elements.

The first lens element 210 with positive refractive power has an outer-side surface 211 being convex in a paraxial region thereof and an inner-side surface 212 being convex in a paraxial region thereof. The first lens element 210 is made of glass material and has the outer-side surface 211 and the inner-side surface 212 being both aspheric. The inner-side surface 212 of the first lens element 210 has at least one inflection point and at least one critical point.

The second lens element 220 with negative refractive power has an outer-side surface 221 being concave in a paraxial region thereof and an inner-side surface 222 being concave in a paraxial region thereof. The second lens element 220 is made of plastic material and has the outer-side surface 221 and the inner-side surface 222 being both aspheric. Each of the outer-side surface 221 and the inner-side surface 222 of the second lens element 220 has at least one inflection point.

The third lens element 230 with negative refractive power has an outer-side surface 231 being convex in a paraxial region thereof and an inner-side surface 232 being concave in a paraxial region thereof. The third lens element 230 is made of plastic material and has the outer-side surface 231 and the inner-side surface 232 being both aspheric. Each of the outer-side surface 231 and the inner-side surface 232 of the third lens element 230 has at least one inflection point.

The fourth lens element 240 with positive refractive power has an outer-side surface 241 being convex in a paraxial region thereof and an inner-side surface 242 being concave in a paraxial region thereof. The fourth lens element 240 is made of plastic material and has the outer-side surface 241 and the inner-side surface 242 being both aspheric. Each of the outer-side surface 241 and the inner-side surface 242 of the fourth lens element 240 has at least one inflection point.

The light source 260 is disposed on or near the conjugate surface 250 of the lens system. The diffractive optical element 270 is made of silica. The diffractive optical element 270 and the cover glass 280 are located between the aperture stop 200 and the outer-side surface 211 of the first lens element 210, and will not affect the focal length of the lens system.

The detailed optical data of the 2nd embodiment are shown in Table 3 and the aspheric surface data are shown in Table 4 below.

TABLE 3

2nd Embodiment
f = 3.20 mm, Fno = 2.04, HFOV = 11.3 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 550.000 | | | | | |
| 1 | Ape. Stop | Plano | 0.015 | | | | | |
| 2 | DOE | Plano | 0.180 | Silica | 1.451 | 67.8 | — | — |
| 3 | | Plano | 0.015 | | | | | |
| 4 | Cover Glass | Plano | 0.180 | Glass | 1.508 | 64.2 | — | — |
| 5 | | Plano | 0.080 | | | | | |
| 6 | Lens 1 | 1.099 (ASP) | 0.907 | Glass | 1.508 | 64.2 | 1.64 | 2.7 |
| 7 | | −2.508 (ASP) | 0.357 | | | | | |
| 8 | Lens 2 | −20.353 (ASP) | 0.250 | Plastic | 1.641 | 19.5 | −1.11 | −115.0 |
| 9 | | 0.742 (ASP) | 0.600 | | | | | |
| 10 | Lens 3 | 1.425 (ASP) | 0.330 | Plastic | 1.641 | 19.5 | −11.08 | −115.0 |
| 11 | | 1.080 (ASP) | 0.374 | | | | | |
| 12 | Lens 4 | 0.936 (ASP) | 0.400 | Plastic | 1.626 | 21.5 | 1.54 | −117.5 |
| 13 | | 27.778 (ASP) | 0.135 | | | | | |
| 14 | Light Source | Plano | — | | | | | |

Note:
Reference wavelength is 940.0 nm.

TABLE 4

Aspheric Coefficients

| Surface # | 6 | 7 | 8 | 9 |
|---|---|---|---|---|
| k= | −6.2196E−01 | −1.0556E+01 | 9.0000E+01 | 1.6668E−01 |
| A4= | 3.1623E−02 | 4.2819E−01 | 2.3144E+00 | 2.7379E+00 |
| A6= | 3.0799E−02 | −4.4288E−01 | −8.6225E+00 | −6.7621E+00 |
| A8= | 7.7548E−02 | 5.5955E−02 | 2.4494E+01 | 4.2572E+01 |
| A10= | −1.3407E−01 | −1.8201E−01 | −5.7401E+01 | −2.2936E+02 |
| A12= | 4.8283E−02 | 2.5453E−01 | 5.1358E+01 | 3.2092E+02 |
| Surface # | 10 | 11 | 12 | 13 |
| k= | 6.9120E−02 | −2.5504E+00 | 1.8100E−01 | 9.0000E+01 |
| A4= | −1.0794E+00 | −1.9899E+00 | −3.3245E−01 | −2.7306E−02 |
| A6= | 2.3106E+00 | 3.7354E+00 | −6.8095E−01 | 3.1734E+00 |
| A8= | −6.0639E+00 | −8.6617E+00 | 4.0885E+00 | −1.2168E+01 |
| A10= | 1.0710E+01 | 1.2430E+01 | −1.6529E+01 | 1.5218E+01 |
| A12= | −7.7529E+00 | −7.4927E+00 | 1.7253E+01 | −5.0918E+00 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.20 | Σ|f/fi| | 7.19 |
| Fno | 2.04 | f/T34 | 8.55 |
| HFOV [deg.] | 11.3 | BL/f | 0.04 |
| λ [nm] | 940.0 | |R5/Y31| | 1.93 |
| Nmax | 1.641 | Y42/Y11 | 0.70 |
| ΣVdi | 124.7 | (Y42 × 2)/EPD | 0.85 |
| ΣCTi [mm] | 1.89 | Yp21/f | 0.02 |
| TD [mm] | 3.22 | Yp22/f | 0.15 |
| Ymax [mm] | 0.96 | — | — |

3rd Embodiment

Figure 5:
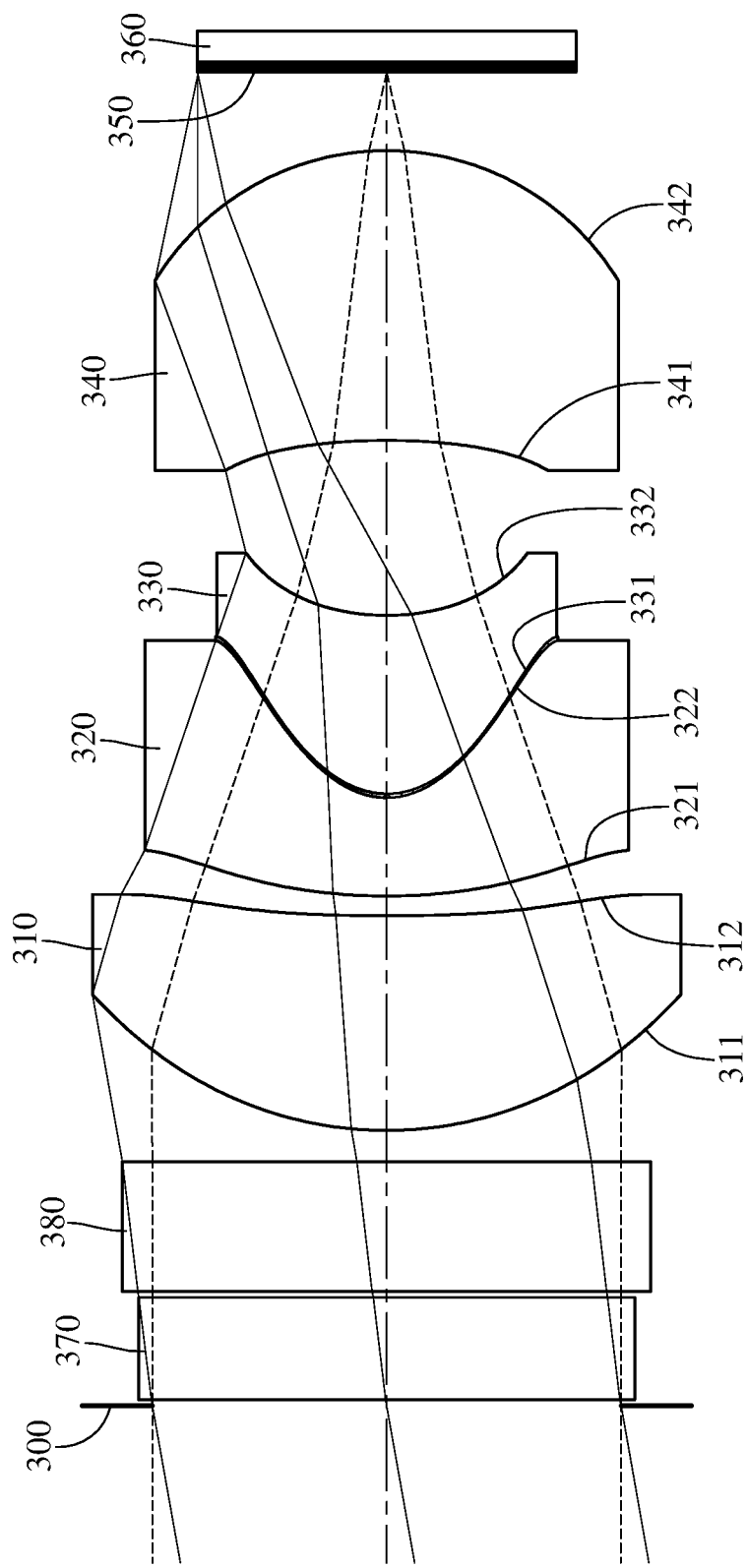
FIG. 5 is a schematic view of a projection device according to the 3rd embodiment of the present disclosure.
Figure 6:
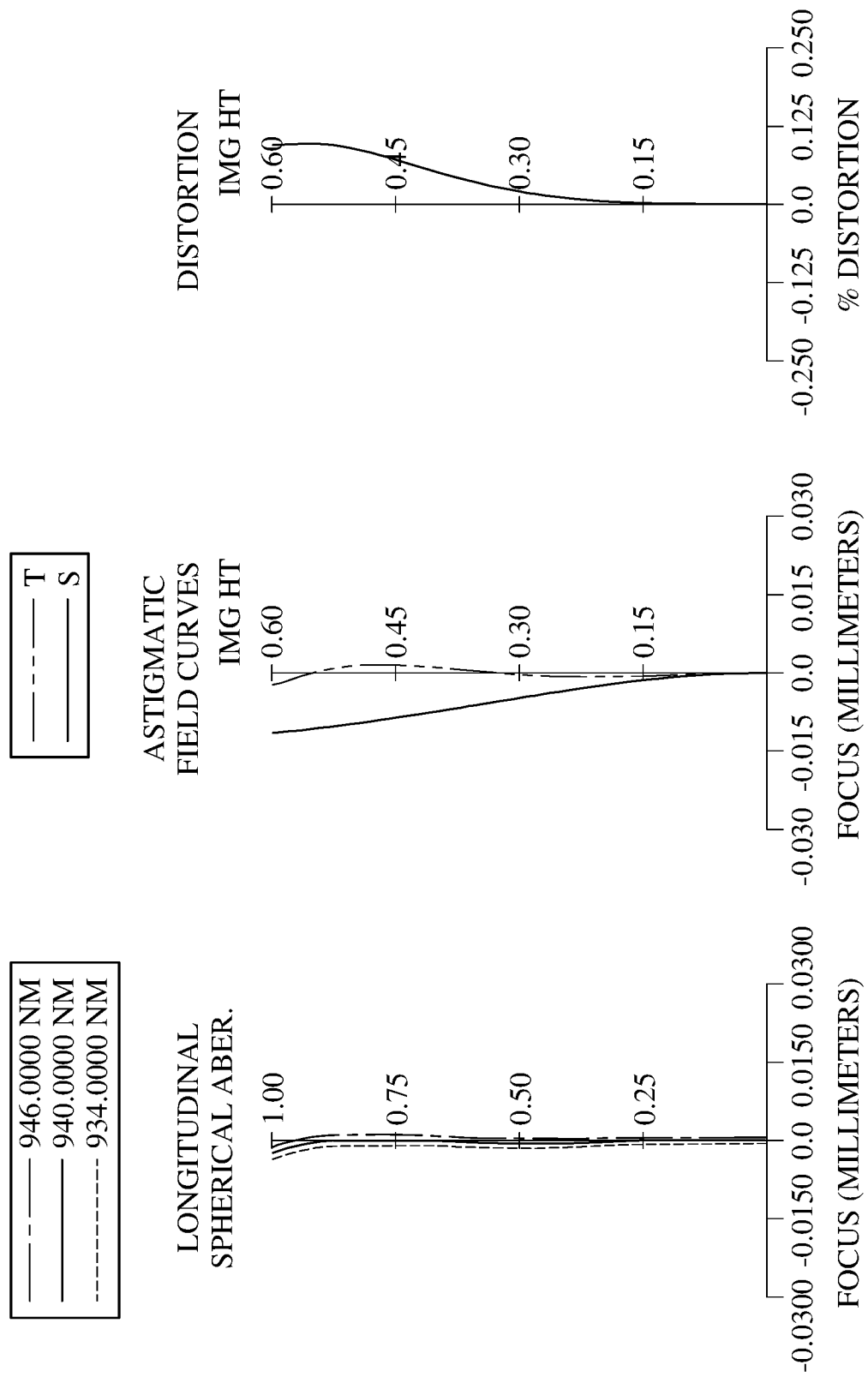
FIG. 6 shows spherical aberration curves, astigmatic field curves and a distortion curve of the projection device according to the 3rd embodiment.

FIG. 5 is a schematic view of a projection device according to the 3rd embodiment of the present disclosure. FIG. 6 shows, in order from left to right, spherical aberration curves, astigmatic field curves and a distortion curve of the projection device according to the 3rd embodiment. In FIG. 5, the projection device includes a lens system (its reference numeral is omitted) of the present disclosure, a light source 360, a diffractive optical element 370 and a cover glass 380. The lens system includes, in order from an outer side to an inner side, an aperture stop 300, a first lens element 310, a second lens element 320, a third lens element 330, a fourth lens element 340 and a conjugate surface 350. The lens system includes four lens elements (310, 320, 330 and 340) with no additional lens element disposed between each of the adjacent four lens elements.

The first lens element 310 with positive refractive power has an outer-side surface 311 being convex in a paraxial region thereof and an inner-side surface 312 being concave in a paraxial region thereof. The first lens element 310 is made of plastic material and has the outer-side surface 311 and the inner-side surface 312 being both aspheric. The inner-side surface 312 of the first lens element 310 has at least one inflection point and at least one critical point.

The second lens element 320 with negative refractive power has an outer-side surface 321 being convex in a paraxial region thereof and an inner-side surface 322 being concave in a paraxial region thereof. The second lens element 320 is made of plastic material and has the outer-side surface 321 and the inner-side surface 322 being both aspheric. Each of the outer-side surface 321 and the inner-side surface 322 of the second lens element 320 has at least one inflection point. Each of the outer-side surface 321 and the inner-side surface 322 of the second lens element 320 has at least one critical point.

The third lens element 330 with positive refractive power has an outer-side surface 331 being convex in a paraxial region thereof and an inner-side surface 332 being concave in a paraxial region thereof. The third lens element 330 is made of plastic material and has the outer-side surface 331 and the inner-side surface 332 being both aspheric. The outer-side surface 331 of the third lens element 330 has at least one inflection point and at least one critical point. The outer-side surface 331 of the third lens element 330 is cemented to the inner-side surface 322 of the second lens element 320.

The fourth lens element 340 with positive refractive power has an outer-side surface 341 being concave in a paraxial region thereof and an inner-side surface 342 being convex in a paraxial region thereof. The fourth lens element 340 is made of plastic material and has the outer-side surface 341 and the inner-side surface 342 being both aspheric.

The light source 360 is disposed on or near the conjugate surface 350 of the lens system. The diffractive optical element 370 is made of silica. The diffractive optical element 370 and the cover glass 380 are located between the aperture stop 300 and the outer-side surface 311 of the first lens element 310, and will not affect the focal length of the lens system.

The detailed optical data of the 3rd embodiment are shown in Table 5 and the aspheric surface data are shown in Table 6 below.

TABLE 5

3rd Embodiment
f = 3.37 mm, Fno = 2.27, HFOV = 10.1 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 750.000 | | | | | |
| 1 | Ape. Stop | Plano | 0.019 | | | | | |
| 2 | DOE | Plano | 0.325 | Silica | 1.451 | 67.8 | — | — |
| 3 | | Plano | 0.019 | | | | | |
| 4 | Cover Glass | Plano | 0.413 | Glass | 1.508 | 64.2 | — | — |
| 5 | | Plano | 0.100 | | | | | |
| 6 | Lens 1 | 1.203 (ASP) | 0.683 | Plastic | 1.616 | 23.3 | 2.26 | −73.3 |
| 7 | | 6.908 (ASP) | 0.063 | | | | | |
| 8 | Lens 2 | 1.772 (ASP) | 0.313 | Plastic | 1.634 | 20.4 | −0.46 | −117.0 |
| 9 | | 0.233 (ASP) | 0.013 | Cement | 1.477 | 53.2 | | |
| 10 | Lens 3 | 0.252 (ASP) | 0.568 | Plastic | 1.616 | 23.3 | 0.43 | −73.3 |
| 11 | | 0.740 (ASP) | 0.556 | | | | | |
| 12 | Lens 4 | −2.100 (ASP) | 0.921 | Plastic | 1.535 | 56.0 | 2.16 | −106.1 |
| 13 | | −0.860 (ASP) | 0.250 | | | | | |
| 14 | Light Source | Plano | — | | | | | |

Note:
Reference wavelength is 940.0 nm.

TABLE 6

Aspheric Coefficients

| Surface # | 6 | 7 | 8 | 9 |
|---|---|---|---|---|
| k= | −4.2773E−01 | 1.0516E+01 | −2.5060E+01 | −1.3012E+00 |
| A4= | 3.3649E−02 | 2.2401E−01 | 4.4862E−01 | 2.0387E+00 |
| A6= | 2.2413E−04 | −1.5734E−01 | −3.5696E−01 | 1.7235E+00 |
| A8= | 3.3367E−02 | −3.5707E−01 | −4.2475E−01 | −2.6950E+01 |
| A10= | −2.6452E−02 | 2.6328E−01 | 2.1585E−01 | — |

| Surface # | 10 | 11 | 12 | 13 |
|---|---|---|---|---|
| k= | −1.1870E+00 | 6.5143E−01 | 8.1623E+00 | −5.2525E−01 |
| A4= | 2.2397E+00 | 4.5217E−01 | −1.6541E−01 | −1.0704E−01 |
| A6= | 5.6946E−01 | 2.1604E+00 | −3.6663E−01 | −1.3288E−01 |
| A8= | −2.6834E+01 | −1.1941E+01 | 9.1205E−01 | 9.8926E−02 |
| A10= | — | 5.2836E+01 | −6.6772E+00 | −4.5545E−01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.37 | Σ|f/fi| | 18.26 |
| Fno | 2.27 | f/T34 | 6.07 |
| HFOV [deg.] | 10.1 | BL/f | 0.07 |
| λ [nm] | 940.0 | |R5/Y31| | 0.47 |
| Nmax | 1.634 | Y42/Y11 | 0.79 |
| ΣVdi | 123.0 | (Y42 × 2)/EPD | 0.99 |
| ΣCTi [mm] | 2.48 | Yp21/f | 0.17 |
| TD [mm] | 3.12 | Yp22/f | 0.12 |
| Ymax [mm] | 0.93 | — | — |

4th Embodiment

Figure 7:
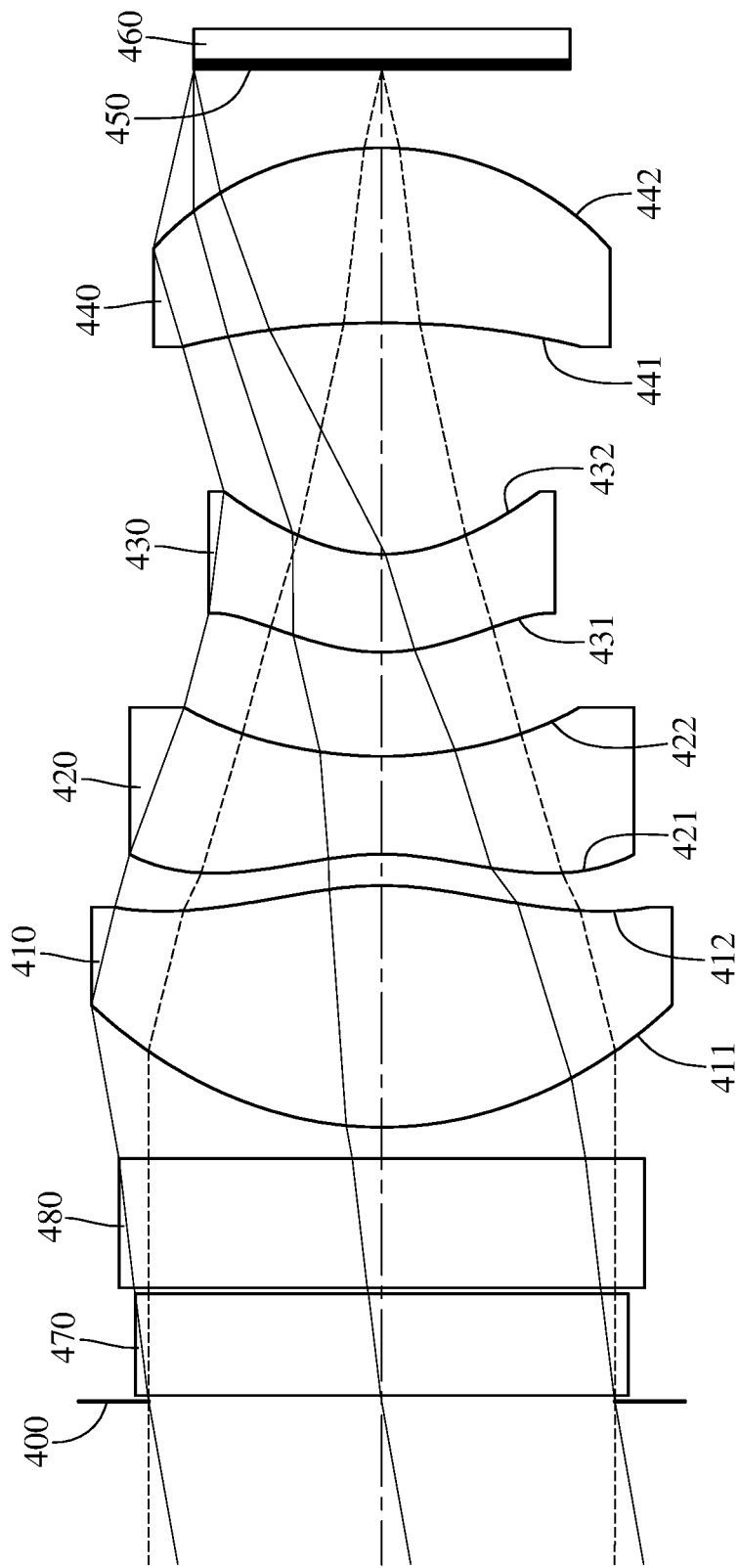
FIG. 7 is a schematic view of a projection device according to the 4th embodiment of the present disclosure.
Figure 8:
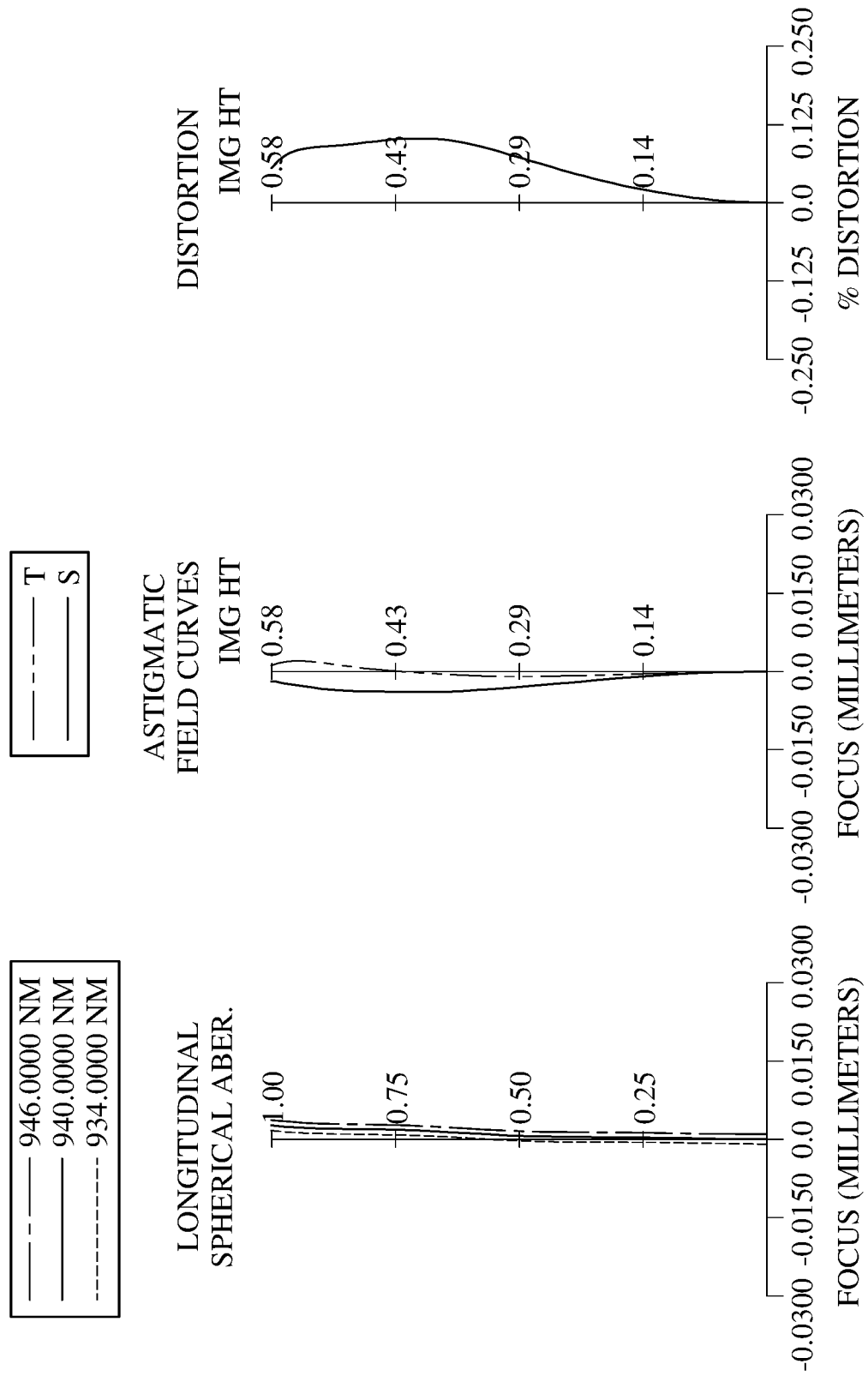
FIG. 8 shows spherical aberration curves, astigmatic field curves and a distortion curve of the projection device according to the 4th embodiment.

FIG. 7 is a schematic view of a projection device according to the 4th embodiment of the present disclosure. FIG. 8 shows, in order from left to right, spherical aberration curves, astigmatic field curves and a distortion curve of the projection device according to the 4th embodiment. In FIG. 7, the projection device includes the lens system (its reference numeral is omitted) of the present disclosure, a light source 460, a diffractive optical element 470 and a cover glass 480. The lens system includes, in order from an outer side to an inner side, an aperture stop 400, a first lens element 410, a second lens element 420, a third lens element 430, a fourth lens element 440 and a conjugate surface 450. The lens system includes four lens elements (410, 420, 430 and 440) with no additional lens element disposed between each of the adjacent four lens elements.

The first lens element 410 with positive refractive power has an outer-side surface 411 being convex in a paraxial region thereof and an inner-side surface 412 being convex in a paraxial region thereof. The first lens element 410 is made of plastic material and has the outer-side surface 411 and the inner-side surface 412 being both aspheric. The inner-side surface 412 of the first lens element 410 has at least one inflection point and at least one critical point.

The second lens element 420 with negative refractive power has an outer-side surface 421 being concave in a paraxial region thereof and an inner-side surface 422 being concave in a paraxial region thereof. The second lens element 420 is made of plastic material and has the outer-side surface 421 and the inner-side surface 422 being both aspheric. The outer-side surface 421 of the second lens element 420 has at least one inflection point and at least one critical point.

The third lens element 430 with positive refractive power has an outer-side surface 431 being convex in a paraxial region thereof and an inner-side surface 432 being concave in a paraxial region thereof. The third lens element 430 is made of plastic material and has the outer-side surface 431 and the inner-side surface 432 being both aspheric. The outer-side surface 431 of the third lens element 430 has at least one inflection point and at least one critical point.

The fourth lens element 440 with positive refractive power has an outer-side surface 441 being concave in a paraxial region thereof and an inner-side surface 442 being convex in a paraxial region thereof. The fourth lens element 440 is made of plastic material and has the outer-side surface 441 and the inner-side surface 442 being both aspheric.

The light source 460 is disposed on or near the conjugate surface 450 of the lens system. The diffractive optical element 470 is made of silica. The diffractive optical element 470 and the cover glass 480 are located between the aperture stop 400 and the outer-side surface 411 of the first lens element 410, and will not affect the focal length of the lens system.

The detailed optical data of the 4th embodiment are shown in Table 7 and the aspheric surface data are shown in Table 8 below.

TABLE 7

4th Embodiment
f = 3.24 mm, Fno = 2.27, HFOV = 10.1 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 720.000 | | | | | |
| 1 | Ape. Stop | Plano | 0.018 | | | | | |
| 2 | DOE | Plano | 0.312 | Silica | 1.451 | 67.8 | — | — |
| 3 | | Plano | 0.018 | | | | | |
| 4 | Cover Glass | Plano | 0.396 | Glass | 1.508 | 64.2 | — | — |
| 5 | | Plano | 0.096 | | | | | |
| 6 | Lens 1 | 1.158 (ASP) | 0.740 | Plastic | 1.616 | 23.3 | 1.01 | −73.3 |
| 7 | | −1.008 (ASP) | 0.096 | | | | | |
| 8 | Lens 2 | −0.846 (ASP) | 0.300 | Plastic | 1.634 | 20.4 | −0.75 | −117.0 |
| 9 | | 1.250 (ASP) | 0.319 | | | | | |
| 10 | Lens 3 | 0.611 (ASP) | 0.300 | Plastic | 1.616 | 23.3 | 11.66 | −73.3 |
| 11 | | 0.543 (ASP) | 0.709 | | | | | |
| 12 | Lens 4 | −2.847 (ASP) | 0.536 | Plastic | 1.616 | 23.3 | 2.14 | −73.3 |
| 13 | | −0.966 (ASP) | 0.240 | | | | | |
| 14 | Light Source | Plano | — | | | | | |

Note:
Reference wavelength is 940.0 nm.

TABLE 8

Aspheric Coefficients

| Surface # | 6 | 7 | 8 | 9 |
|---|---|---|---|---|
| k= | −9.8211E−01 | −1.3406E+01 | −1.3123E+01 | 3.0934E−01 |
| A4= | 4.6021E−02 | 2.7576E−01 | 5.8041E−01 | −5.3284E−01 |
| A6= | −9.2945E−03 | −1.1648E−01 | −3.0638E−01 | 2.7730E+00 |
| A8= | 1.8658E−02 | 4.8126E−02 | 9.8237E−02 | −5.7880E+00 |
| A10= | — | — | 1.1202E−01 | 4.3819E+00 |

| Surface # | 10 | 11 | 12 | 13 |
|---|---|---|---|---|
| k= | −3.5495E+00 | −2.2348E−01 | −8.0775E+01 | −7.0637E+00 |
| A4= | −8.6162E−02 | −1.1634E+00 | −5.3588E−01 | −1.0104E+00 |
| A6= | −3.3380E+00 | −1.8105E+00 | 1.9814E+00 | 2.4379E+00 |
| A8= | 1.1925E+01 | 1.3649E+00 | −8.0464E+00 | −7.2140E+00 |
| A10= | −2.5154E+01 | −3.9172E+01 | 2.3971E+01 | 1.3214E+01 |
| A12= | — | 2.9825E−08 | −2.9047E+01 | −1.0494E+01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.24 | Σ\|f/fi\| | 9.31 |
| Fno | 2.27 | f/T34 | 4.57 |
| HFOV [deg.] | 10.1 | BL/f | 0.07 |
| λ [nm] | 940.0 | \|R5/Y31\| | 1.15 |
| Nmax | 1.634 | Y42/Y11 | 0.79 |
| ΣVdi | 90.3 | (Y42 × 2)/EPD | 0.98 |
| ΣCTi [mm] | 1.88 | Yp21/f | 0.08 |
| TD [mm] | 3.00 | Yp22/f | — |
| Ymax [mm] | 0.89 | — | — |

5th Embodiment

Figure 9:
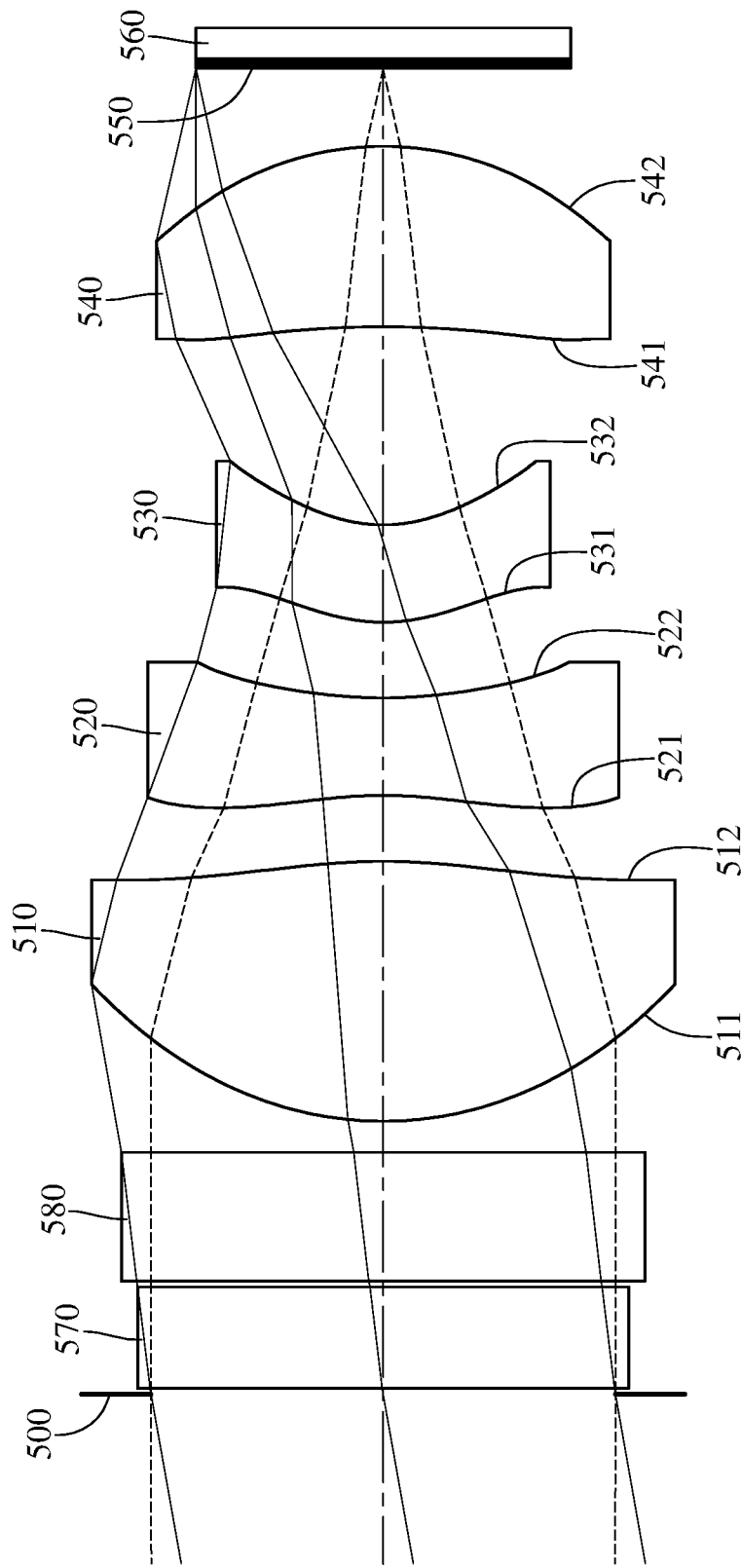
FIG. 9 is a schematic view of a projection device according to the 5th embodiment of the present disclosure.
Figure 10:
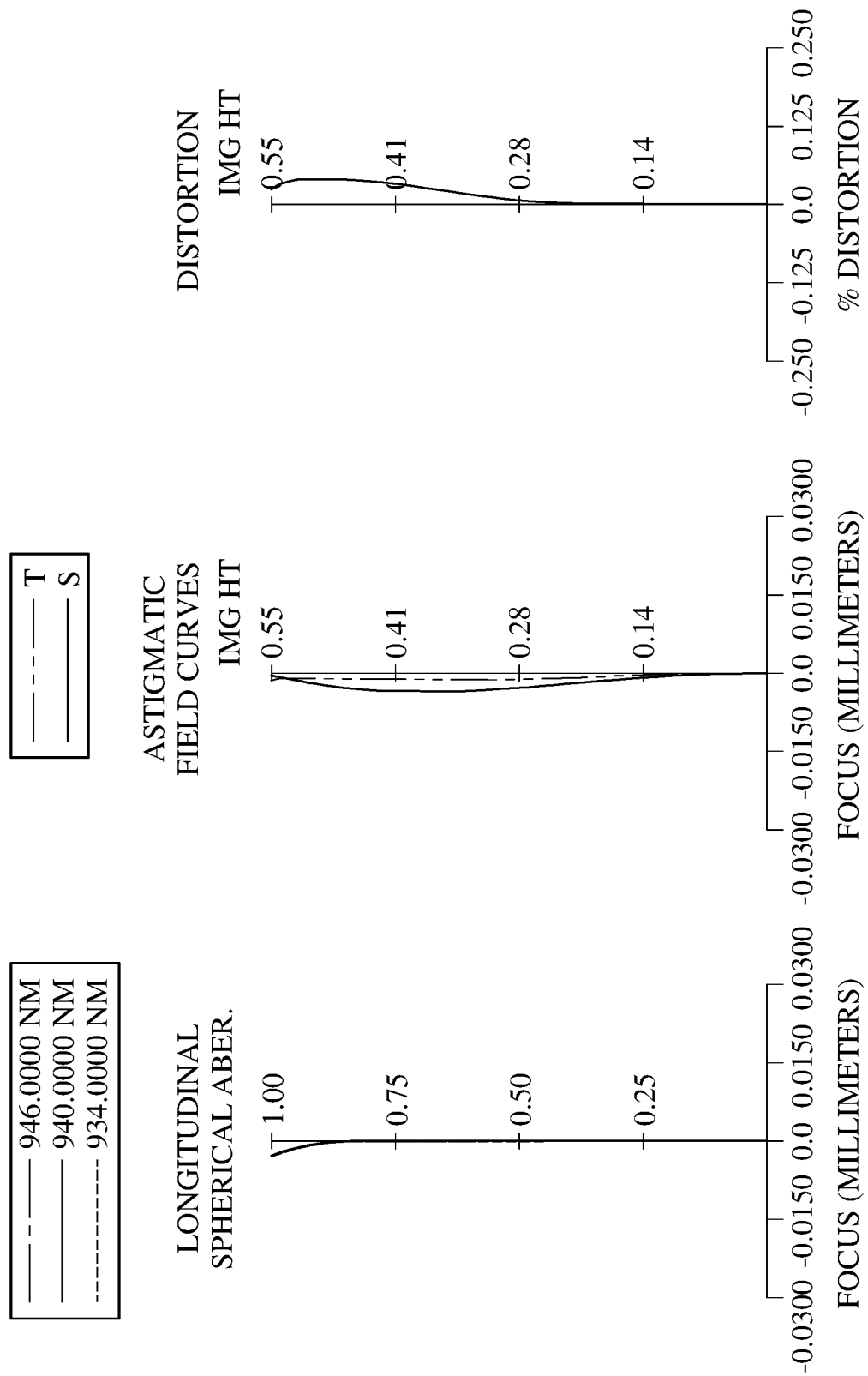
FIG. 10 shows spherical aberration curves, astigmatic field curves and a distortion curve of the projection device according to the 5th embodiment.

FIG. 9 is a schematic view of a projection device according to the 5th embodiment of the present disclosure. FIG. 10 shows, in order from left to right, spherical aberration curves, astigmatic field curves and a distortion curve of the projection device according to the 5th embodiment. In FIG. 9, the projection device includes the lens system (its reference numeral is omitted) of the present disclosure, a light source 560, a diffractive optical element 570 and a cover glass 580. The lens system includes, in order from an outer side to an inner side, an aperture stop 500, a first lens element 510, a second lens element 520, a third lens element 530, a fourth lens element 540 and a conjugate surface 550. The lens system includes four lens elements (510, 520, 530 and 540) with no additional lens element disposed between each of the adjacent four lens elements.

The first lens element 510 with positive refractive power has an outer-side surface 511 being convex in a paraxial region thereof and an inner-side surface 512 being convex in a paraxial region thereof. The first lens element 510 is made of plastic material and has the outer-side surface 511 and the inner-side surface 512 being both aspheric. The inner-side surface 512 of the first lens element 510 has at least one inflection point and at least one critical point.

The second lens element 520 with negative refractive power has an outer-side surface 521 being concave in a paraxial region thereof and an inner-side surface 522 being concave in a paraxial region thereof. The second lens element 520 is made of plastic material and has the outer-side surface 521 and the inner-side surface 522 being both aspheric. The outer-side surface 521 of the second lens element 520 has at least one inflection point and at least one critical point.

The third lens element 530 with positive refractive power has an outer-side surface 531 being convex in a paraxial region thereof and an inner-side surface 532 being concave in a paraxial region thereof. The third lens element 530 is made of plastic material and has the outer-side surface 531 and the inner-side surface 532 being both aspheric. The outer-side surface 531 of the third lens element 530 has at least one inflection point and at least one critical point.

The fourth lens element 540 with positive refractive power has an outer-side surface 541 being concave in a paraxial region thereof and an inner-side surface 542 being convex in a paraxial region thereof. The fourth lens element 540 is made of plastic material and has the outer-side surface 541 and the inner-side surface 542 being both aspheric. The outer-side surface 541 of the fourth lens element 540 has at least one inflection point and at least one critical point.

The light source 560 is disposed on or near the conjugate surface 550 of the lens system. The diffractive optical element 570 is made of silica. The diffractive optical element 570 and the cover glass 580 are located between the aperture stop 500 and the outer-side surface 511 of the first lens element 510, and will not affect the focal length of the lens system.

The detailed optical data of the 5th embodiment are shown in Table 9 and the aspheric surface data are shown in Table 10 below.

TABLE 9

5th Embodiment
f = 3.11 mm, Fno = 2.27, HFOV = 10.1 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 690.000 | | | | | |
| 1 | Ape. Stop | Plano | 0.017 | | | | | |
| 2 | DOE | Plano | 0.299 | Silica | 1.451 | 67.8 | — | — |
| 3 | | Plano | 0.017 | | | | | |
| 4 | Cover Glass | Plano | 0.380 | Glass | 1.508 | 64.2 | — | — |
| 5 | | Plano | 0.092 | | | | | |
| 6 | Lens 1 | 1.038 (ASP) | 0.767 | Plastic | 1.535 | 56.0 | 1.33 | −106.1 |
| 7 | | −1.696 (ASP) | 0.194 | | | | | |
| 8 | Lens 2 | −1.211 (ASP) | 0.288 | Plastic | 1.634 | 20.4 | −0.98 | −117.0 |
| 9 | | 1.396 (ASP) | 0.223 | | | | | |
| 10 | Lens 3 | 0.526 (ASP) | 0.288 | Plastic | 1.634 | 20.4 | 8.23 | −117.0 |
| 11 | | 0.461 (ASP) | 0.584 | | | | | |
| 12 | Lens 4 | −2.922 (ASP) | 0.532 | Plastic | 1.634 | 20.4 | 1.89 | −117.0 |
| 13 | | −0.910 (ASP) | 0.230 | | | | | |
| 14 | Light Source | Plano | — | | | | | |

Note:
Reference wavelength is 940.0 nm.

TABLE 10

Aspheric Coefficients

| Surface # | 6 | 7 | 8 | 9 |
|---|---|---|---|---|
| k= | −7.8861E−01 | −2.5415E+01 | −2.2941E+01 | 1.9982E+00 |
| A4= | 5.3901E−02 | 2.1431E−01 | 5.6531E−01 | −8.4112E−01 |
| A6= | 1.1808E−02 | −2.1991E−01 | −6.2335E−01 | 3.9270E+00 |
| A8= | — | 1.3024E−01 | 6.4813E−01 | −1.0189E+01 |
| A10= | — | — | — | 1.3926E+01 |

| Surface # | 10 | 11 | 12 | 13 |
|---|---|---|---|---|
| k= | −3.2627E+00 | −3.3468E−01 | −5.2473E+01 | −4.3942E+00 |
| A4= | −2.3848E−01 | −1.6531E+00 | −2.2213E−01 | −7.1851E−01 |
| A6= | −6.7927E+00 | −6.5937E+00 | 5.5467E−01 | 8.9082E−01 |
| A8= | 1.8259E+01 | 3.5244E+01 | −3.6144E−01 | −1.8097E+00 |
| A10= | −2.2727E+01 | −6.8566E+01 | 5.2620E+00 | 2.5076E+00 |
| A12= | — | — | −7.0839E+00 | −6.6706E−01 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.11 | Σ\|f/fi\| | 7.51 |
| Fno | 2.27 | f/T34 | 5.32 |
| HFOV [deg.] | 10.1 | BL/f | 0.07 |
| λ [nm] | 940.0 | \|R5/Y31\| | 1.07 |
| Nmax | 1.634 | Y42/Y11 | 0.78 |
| ΣVdi | 117.2 | (Y42 × 2)/EPD | 0.98 |
| ΣCTi [mm] | 1.87 | Yp21/f | 0.08 |
| TD [mm] | 2.88 | Yp22/f | — |
| Ymax [mm] | 0.86 | — | — |

6th Embodiment

Figure 11:
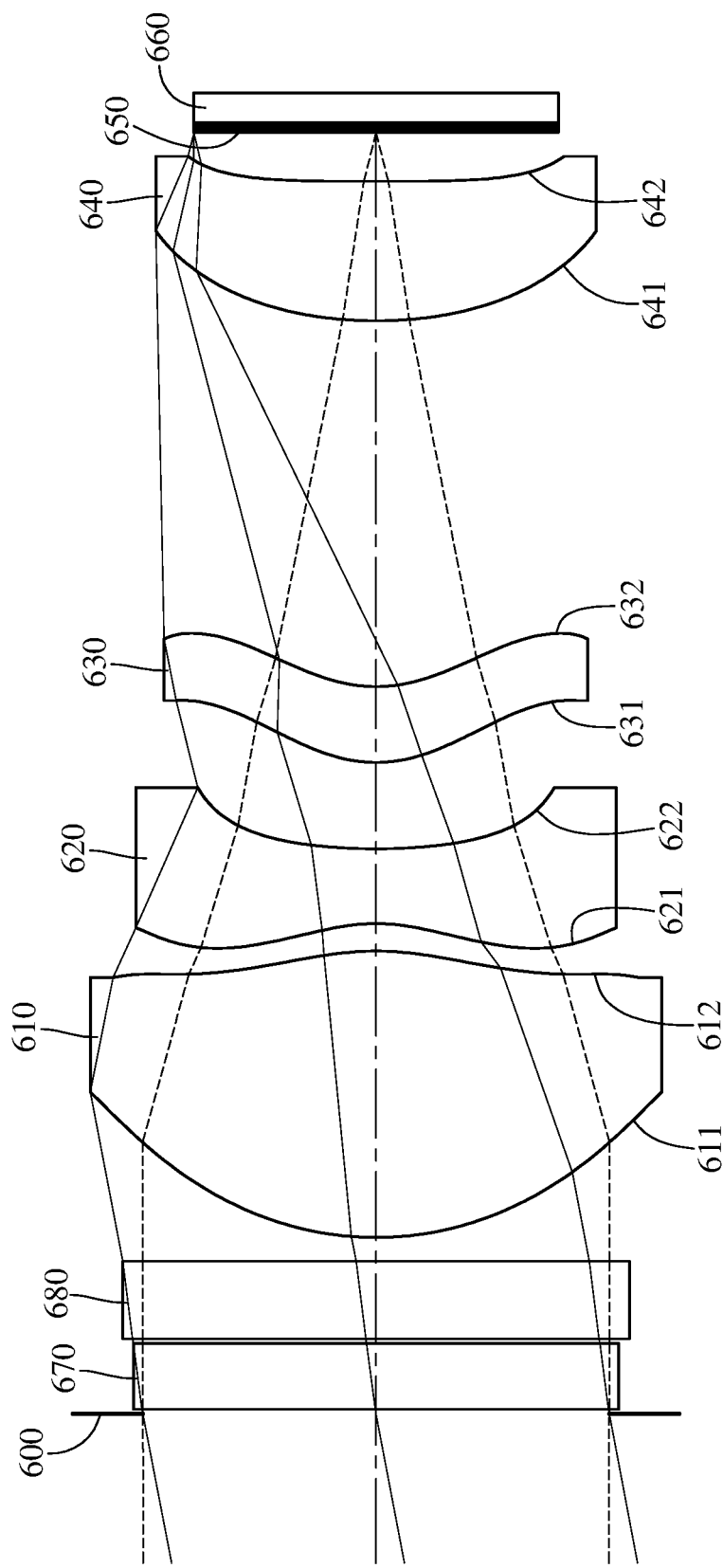
FIG. 11 is a schematic view of a projection device according to the 6th embodiment of the present disclosure.
Figure 12:
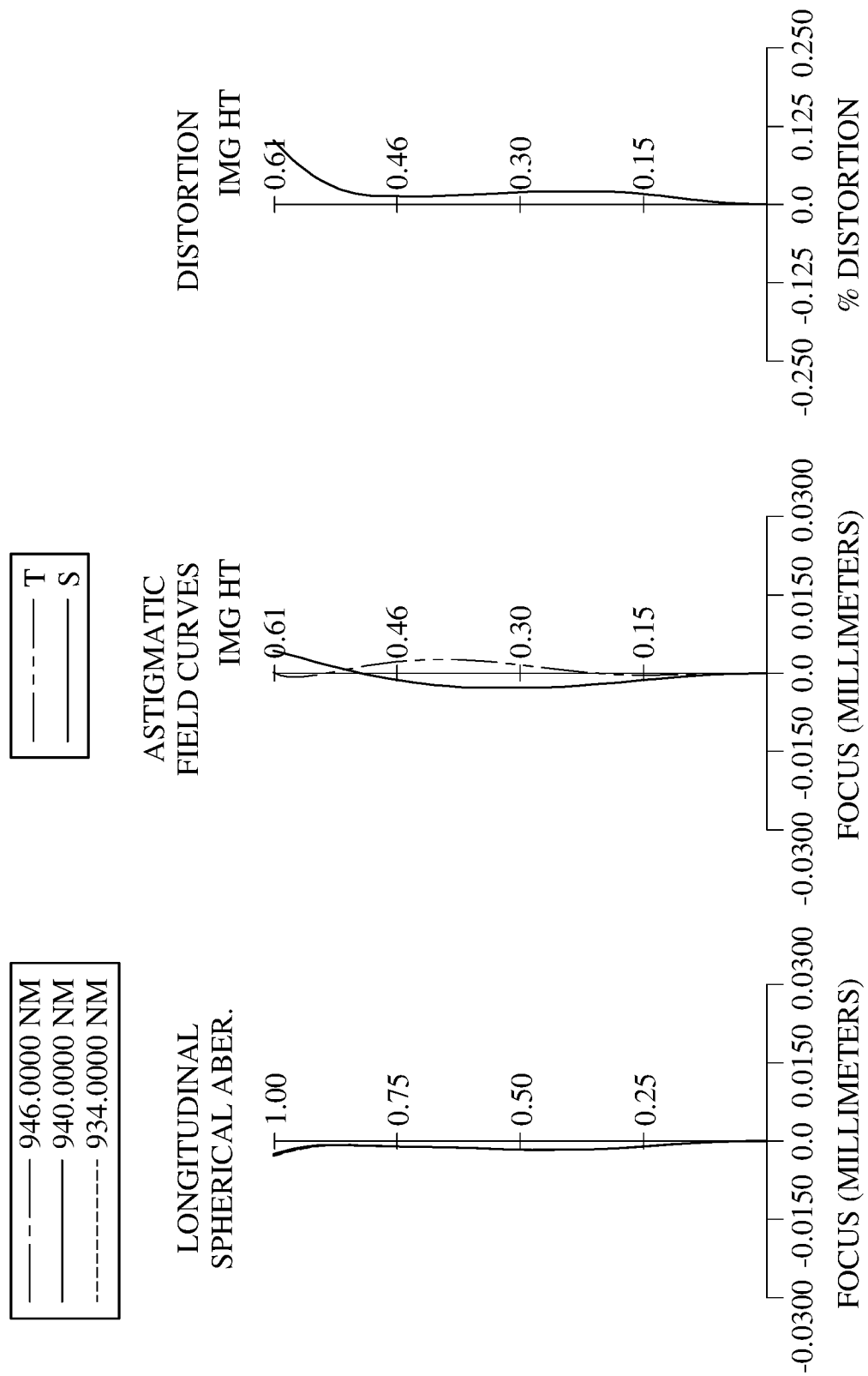
FIG. 12 shows spherical aberration curves, astigmatic field curves and a distortion curve of the projection device according to the 6th embodiment.

FIG. 11 is a schematic view of a projection device according to the 6th embodiment of the present disclosure. FIG. 12 shows, in order from left to right, spherical aberration curves, astigmatic field curves and a distortion curve of the projection device according to the 6th embodiment. In FIG. 11, the projection device includes the lens system (its reference numeral is omitted) of the present disclosure, a light source 660, a diffractive optical element 670 and a cover glass 680. The lens system includes, in order from an outer side to an inner side, an aperture stop 600, a first lens element 610, a second lens element 620, a third lens element 630, a fourth lens element 640 and a conjugate surface 650. The lens system includes four lens elements (610, 620, 630 and 640) with no additional lens element disposed between each of the adjacent four lens elements.

The first lens element 610 with positive refractive power has an outer-side surface 611 being convex in a paraxial region thereof and an inner-side surface 612 being convex in a paraxial region thereof. The first lens element 610 is made of glass material and has the outer-side surface 611 and the inner-side surface 612 being both aspheric. Each of the outer-side surface 611 and the inner-side surface 612 of the first lens element 610 has at least one inflection point. The inner-side surface 612 of the first lens element 610 has at least one critical point.

The second lens element 620 with negative refractive power has an outer-side surface 621 being concave in a paraxial region thereof and an inner-side surface 622 being concave in a paraxial region thereof. The second lens element 620 is made of plastic material and has the outer-side surface 621 and the inner-side surface 622 being both aspheric. The outer-side surface 621 of the second lens element 620 has at least one inflection point and at least one critical point.

The third lens element 630 with positive refractive power has an outer-side surface 631 being convex in a paraxial region thereof and an inner-side surface 632 being concave in a paraxial region thereof. The third lens element 630 is made of plastic material and has the outer-side surface 631 and the inner-side surface 632 being both aspheric. Each of the outer-side surface 631 and the inner-side surface 632 of the third lens element 630 has at least one inflection point. Each of the outer-side surface 631 and the inner-side surface 632 of the third lens element 630 has at least one critical point.

The fourth lens element 640 with positive refractive power has an outer-side surface 641 being convex in a paraxial region thereof and an inner-side surface 642 being concave in a paraxial region thereof. The fourth lens element 640 is made of plastic material and has the outer-side surface 641 and the inner-side surface 642 being both aspheric.

The light source 660 is disposed on or near the conjugate surface 650 of the lens system. The diffractive optical element 670 is made of silica. The diffractive optical element 670 and the cover glass 680 are located between the aperture stop 600 and the outer-side surface 611 of the first lens element 610, and will not affect the focal length of the lens system.

The detailed optical data of the 6th embodiment are shown in Table 11 and the aspheric surface data are shown in Table 12 below.

TABLE 11

6th Embodiment
f = 3.20 mm, Fno = 2.05, HFOV = 10.8 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 550.000 | | | | | |
| 1 | Ape. Stop | Plano | 0.015 | | | | | |
| 2 | DOE | Plano | 0.220 | Silica | 1.451 | 67.8 | — | — |
| 3 | | Plano | 0.015 | | | | | |
| 4 | Cover Glass | Plano | 0.260 | Glass | 1.508 | 64.2 | — | — |
| 5 | | Plano | 0.080 | | | | | |
| 6 | Lens 1 | 1.057 (ASP) | 0.959 | Glass | 1.508 | 64.2 | 1.14 | 2.7 |
| 7 | | −0.899 (ASP) | 0.092 | | | | | |
| 8 | Lens 2 | −0.595 (ASP) | 0.250 | Plastic | 1.641 | 19.5 | −0.68 | −115.0 |
| 9 | | 1.899 (ASP) | 0.289 | | | | | |
| 10 | Lens 3 | 0.447 (ASP) | 0.254 | Plastic | 1.641 | 19.5 | 2.48 | −115.0 |
| 11 | | 0.484 (ASP) | 1.225 | | | | | |
| 12 | Lens 4 | 1.385 (ASP) | 0.467 | Plastic | 1.617 | 23.5 | 2.35 | −110.0 |
| 13 | | 27.778 (ASP) | 0.164 | | | | | |
| 14 | Light Source | Plano | — | | | | | |

Note:
Reference wavelength is 940.0 nm.

TABLE 12

Aspheric Coefficients

| Surface # | 6 | 7 | 8 | 9 |
|---|---|---|---|---|
| k= | −7.4337E−01 | −1.3111E+01 | −7.9561E+00 | 7.6241E+00 |
| A4= | 5.3645E−02 | 3.8447E−01 | 8.3547E−01 | −1.5941E−01 |
| A6= | −1.9354E−02 | −6.5176E−01 | −1.2477E+00 | 3.7002E+00 |
| A8= | 5.2018E−02 | 1.9346E+00 | 2.4527E+00 | −1.2923E+01 |
| A10= | −1.6548E−02 | −2.9764E+00 | −2.2312E+00 | 2.5889E+01 |
| A12= | −4.6194E−02 | 1.4178E+00 | 3.9369E−01 | −8.6761E+00 |

| Surface # | 10 | 11 | 12 | 13 |
|---|---|---|---|---|
| k= | −2.0558E+00 | −1.4980E+00 | 1.7316E+00 | 9.0000E+01 |
| A4= | −4.7383E−01 | −9.1475E−01 | 5.6560E−02 | 2.3897E−01 |
| A6= | −3.0976E−01 | −2.1505E+00 | 2.9350E−01 | 4.7576E−01 |
| A8= | −6.0844E+00 | 7.1160E+00 | −8.2575E−01 | 8.5994E−01 |
| A10= | 2.1534E+01 | −7.1354E+00 | 1.1798E+00 | −5.0063E+00 |
| A12= | −2.0674E+01 | 8.0075E−01 | −4.9762E−01 | 9.7177E+00 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.20 | Σ|f/fi| | 10.15 |
| Fno | 2.05 | f/T34 | 2.61 |
| HFOV [deg.] | 10.8 | BL/f | 0.05 |
| λ [nm] | 940.0 | |R5/Y31| | 0.67 |
| Nmax | 1.641 | Y42/Y11 | 0.66 |
| ΣVdi | 126.7 | (Y42 × 2)/EPD | 0.81 |
| ΣCTi [mm] | 1.93 | Yp21/f | 0.08 |
| TD [mm] | 3.54 | Yp22/f | — |
| Ymax [mm] | 0.96 | — | — |

7th Embodiment

Figure 13:
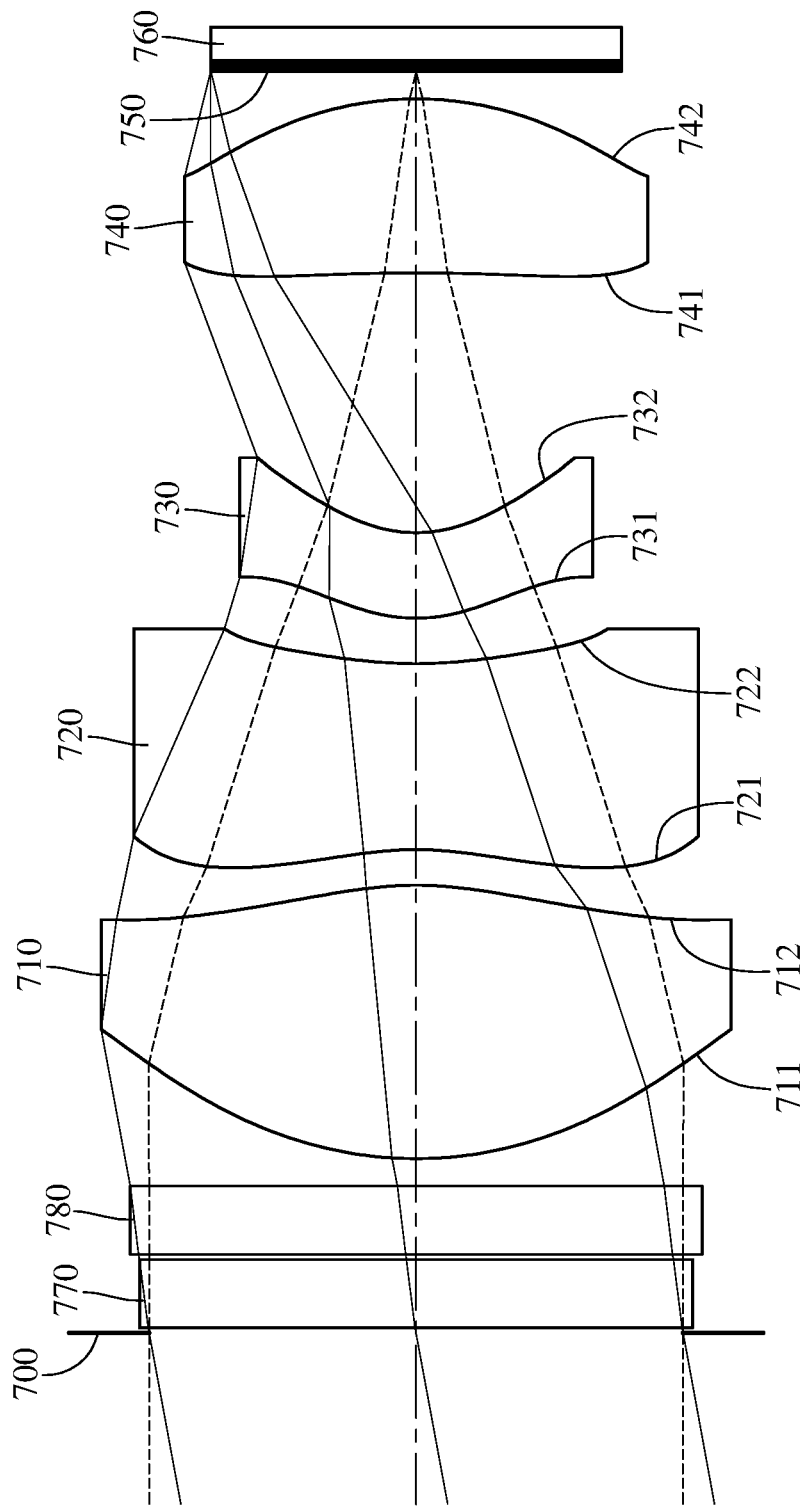
FIG. 13 is a schematic view of a projection device according to the 7th embodiment of the present disclosure.
Figure 14:
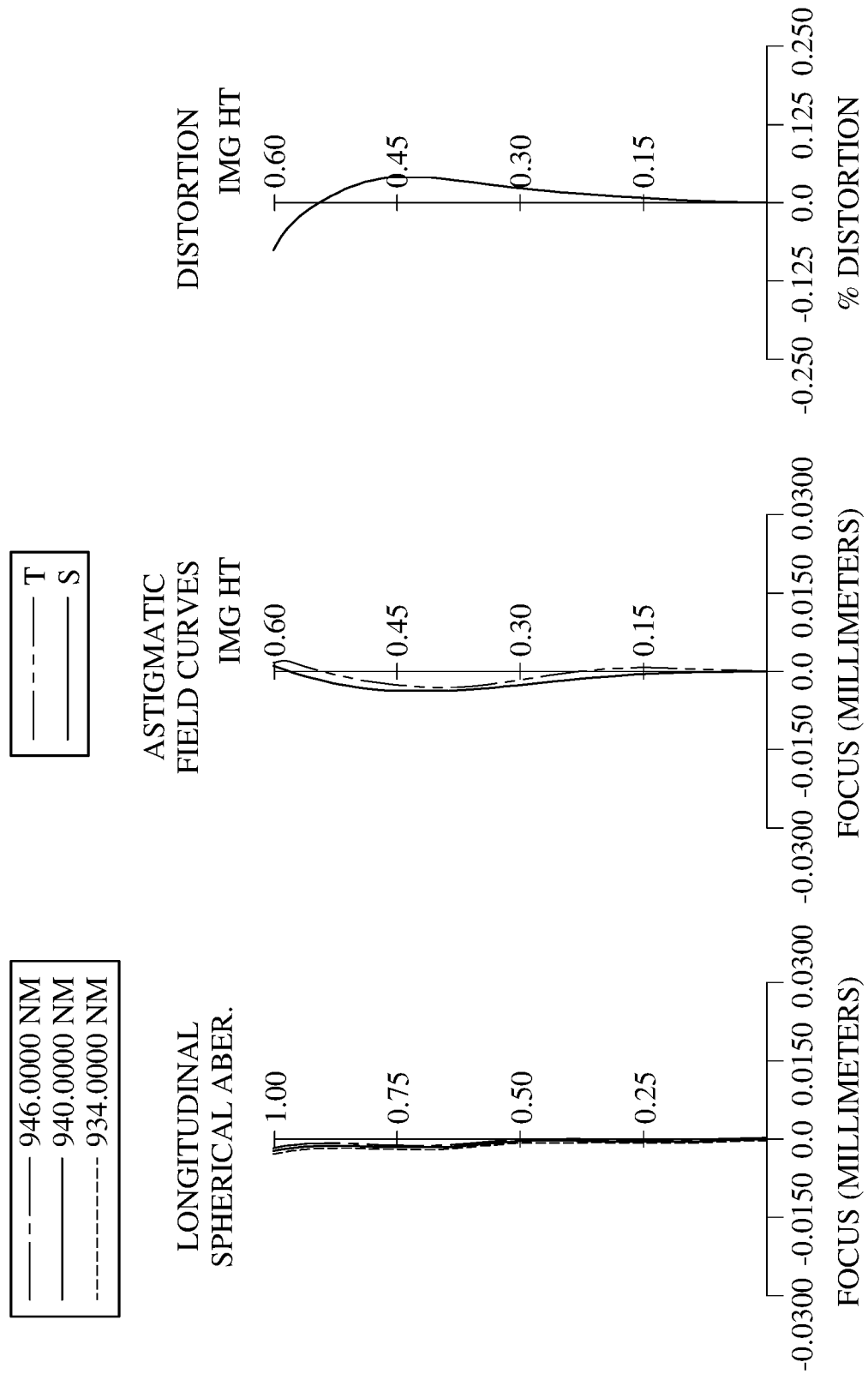
FIG. 14 shows spherical aberration curves, astigmatic field curves and a distortion curve of the projection device according to the 7th embodiment.

FIG. 13 is a schematic view of a projection device according to the 7th embodiment of the present disclosure. FIG. 14 shows, in order from left to right, spherical aberration curves, astigmatic field curves and a distortion curve of the projection device according to the 7th embodiment. In FIG. 13, the projection device includes the lens system (its reference numeral is omitted) of the present disclosure, a light source 760, a diffractive optical element 770 and a cover glass 780. The lens system includes, in order from an outer side to an inner side, an aperture stop 700, a first lens element 710, a second lens element 720, a third lens element 730, a fourth lens element 740 and a conjugate surface 750. The lens system includes four lens elements (710, 720, 730 and 740) with no additional lens element disposed between each of the adjacent four lens elements.

The first lens element 710 with positive refractive power has an outer-side surface 711 being convex in a paraxial region thereof and an inner-side surface 712 being convex in a paraxial region thereof. The first lens element 710 is made of plastic material and has the outer-side surface 711 and the inner-side surface 712 being both aspheric. Each of the outer-side surface 711 and the inner-side surface 712 of the first lens element 710 has at least one inflection point. The inner-side surface 712 of the first lens element 710 has at least one critical point.

The second lens element 720 with negative refractive power has an outer-side surface 721 being concave in a paraxial region thereof and an inner-side surface 722 being concave in a paraxial region thereof. The second lens element 720 is made of plastic material and has the outer-side surface 721 and the inner-side surface 722 being both aspheric. The outer-side surface 721 of the second lens element 720 has at least one inflection point and at least one critical point.

The third lens element 730 with positive refractive power has an outer-side surface 731 being convex in a paraxial region thereof and an inner-side surface 732 being concave in a paraxial region thereof. The third lens element 730 is made of plastic material and has the outer-side surface 731 and the inner-side surface 732 being both aspheric. The outer-side surface 731 of the third lens element 730 has at least one inflection point and at least one critical point.

The fourth lens element 740 with positive refractive power has an outer-side surface 741 being concave in a paraxial region thereof and an inner-side surface 742 being convex in a paraxial region thereof. The fourth lens element 740 is made of glass material and has the outer-side surface 741 and the inner-side surface 742 being both aspheric. Each of the outer-side surface 741 and the inner-side surface 742 of the fourth lens element 740 has at least one inflection point. The outer-side surface 741 of the fourth lens element 740 has at least one critical point.

The light source 760 is disposed on or near the conjugate surface 750 of the lens system. The diffractive optical element 770 is made of silica. The diffractive optical element 770 and the cover glass 780 are located between the aperture stop 700 and the outer-side surface 711 of the first lens element 710, and will not affect the focal length of the lens system.

The detailed optical data of the 7th embodiment are shown in Table 13 and the aspheric surface data are shown in Table 14 below.

TABLE 13

7th Embodiment
f = 3.25 mm, Fno = 2.08, HFOV = 10.5 deg.

| Surface # | | Curvature Radius | | Thickness | Material | Index | Abbe # | Focal Length | dn/dt × $10^{-6}$ |
|---|---|---|---|---|---|---|---|---|---|
| 0 | Object | Plano | | 650.000 | | | | | |
| 1 | Ape. Stop | Plano | | 0.015 | | | | | |
| 2 | DOE | Plano | | 0.200 | Silica | 1.451 | 67.8 | — | — |
| 3 | | Plano | | 0.015 | | | | | |
| 4 | Cover Glass | Plano | | 0.200 | Glass | 1.508 | 64.2 | — | — |
| 5 | | Plano | | 0.080 | | | | | |
| 6 | Lens 1 | 1.135 | (ASP) | 0.800 | Plastic | 1.553 | 37.4 | 1.11 | −95.0 |
| 7 | | −1.001 | (ASP) | 0.104 | | | | | |
| 8 | Lens 2 | −0.933 | (ASP) | 0.544 | Plastic | 1.641 | 19.5 | −0.77 | −115.0 |
| 9 | | 1.297 | (ASP) | 0.133 | | | | | |
| 10 | Lens 3 | 0.459 | (ASP) | 0.250 | Plastic | 1.641 | 19.5 | 8.37 | −115.0 |
| 11 | | 0.395 | (ASP) | 0.760 | | | | | |
| 12 | Lens 4 | −5.908 | (ASP) | 0.509 | Glass | 1.604 | 36.3 | 1.87 | 2.1 |
| 13 | | −0.981 | (ASP) | 0.080 | | | | | |
| 14 | Light Source | Plano | | — | | | | | |

Note:
Reference wavelength is 940.0 nm.

TABLE 14

Aspheric Coefficients

| Surface # | 6 | 7 | 8 | 9 |
|---|---|---|---|---|
| k= | −1.6871E−01 | −1.4072E+01 | −1.7269E+01 | 2.7212E+00 |
| A4= | −2.4569E−02 | 2.9729E−01 | 6.1961E−01 | −1.4045E+00 |
| A6= | −4.5758E−02 | −4.5765E−01 | −1.1603E+00 | 4.9087E+00 |
| A8= | 3.2996E−02 | 2.0886E−01 | 1.7995E+00 | −1.3111E+01 |
| A10= | −1.4079E−01 | 4.0805E−01 | −7.7663E−01 | 1.9773E+01 |
| A12= | 6.0571E−02 | −3.5707E−01 | — | — |

| Surface # | 10 | 11 | 12 | 13 |
|---|---|---|---|---|
| k= | −3.2748E+00 | −5.0369E−01 | −4.5421E−01 | −2.2334E+00 |
| A4= | 2.3407E−01 | −1.9303E+00 | 1.2182E−01 | −2.3588E−01 |
| A6= | −1.2495E+01 | −1.1503E+01 | −1.2631E−01 | −1.0495E−01 |
| A8= | 4.2121E+01 | 6.5806E+01 | 1.7378E+00 | 1.2160E+00 |
| A10= | −5.0937E+01 | −1.4202E+02 | −9.0700E−01 | −3.0406E+00 |
| A12= | — | — | −2.2676E−01 | 5.0434E+00 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.25 | Σ|f/fi| | 9.25 |
| Fno | 2.08 | f/T34 | 4.28 |
| HFOV [deg.] | 10.5 | BL/f | 0.02 |
| λ [nm] | 940.0 | |R5/Y31| | 0.89 |
| Nmax | 1.641 | Y42/Y11 | 0.73 |
| ΣVdi | 112.7 | (Y42 × 2)/EPD | 0.87 |
| ΣCTi [mm] | 2.10 | Yp21/f | 0.08 |
| TD [mm] | 3.10 | Yp22/f | — |
| Ymax [mm] | 0.92 | — | — |

8th Embodiment

Figure 15:
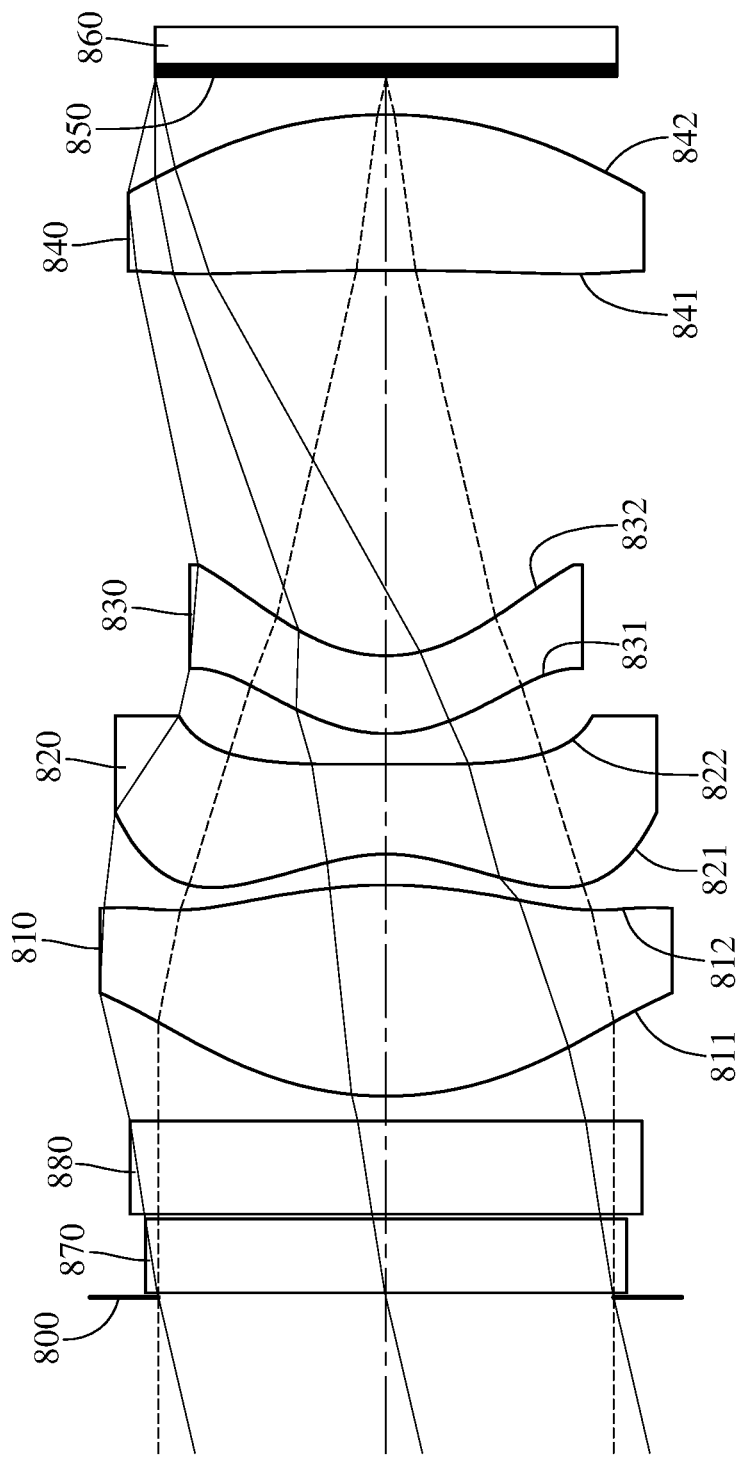
FIG. 15 is a schematic view of a projection device according to the 8th embodiment of the present disclosure.
Figure 16:
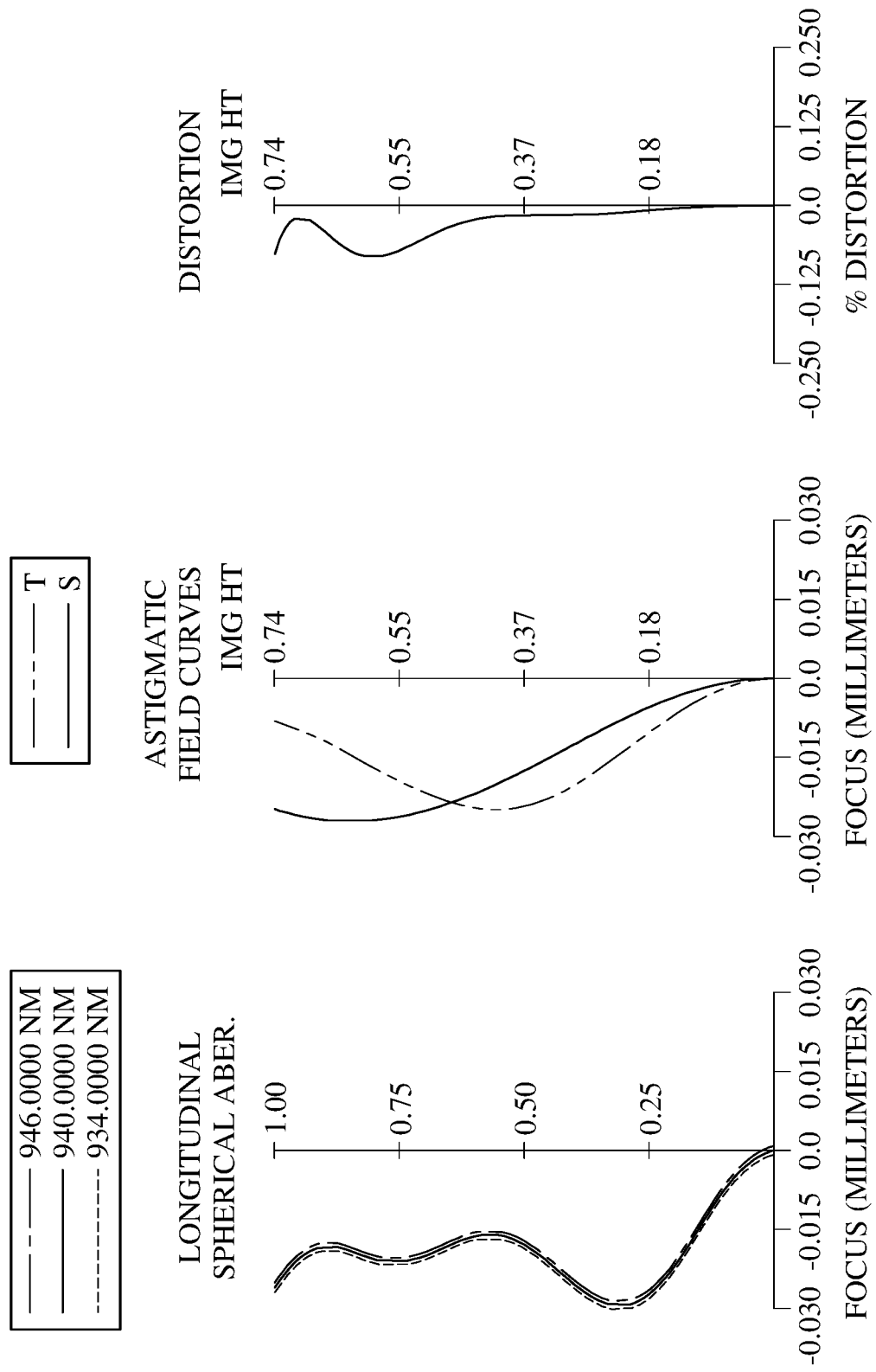
FIG. 16 shows spherical aberration curves, astigmatic field curves and a distortion curve of the projection device according to the 8th embodiment.

FIG. 15 is a schematic view of a projection device according to the 8th embodiment of the present disclosure. FIG. 16 shows, in order from left to right, spherical aberration curves, astigmatic field curves and a distortion curve of the projection device according to the 8th embodiment. In FIG. 15, the projection device includes the lens system (its reference numeral is omitted) of the present disclosure, a light source 860, a diffractive optical element 870 and a cover glass 880. The lens system includes, in order from an outer side to an inner side, an aperture stop 800, a first lens element 810, a second lens element 820, a third lens element 830, a fourth lens element 840 and a conjugate surface 850. The lens system includes four lens elements (810, 820, 830 and 840) with no additional lens element disposed between each of the adjacent four lens elements.

The first lens element 810 with positive refractive power has an outer-side surface 811 being convex in a paraxial region thereof and an inner-side surface 812 being convex in a paraxial region thereof. The first lens element 810 is made of plastic material and has the outer-side surface 811 and the inner-side surface 812 being both aspheric. Each of the outer-side surface 811 and the inner-side surface 812 of the first lens element 810 has at least one inflection point. The inner-side surface 812 of the first lens element 810 has at least one critical point.

The second lens element 820 with negative refractive power has an outer-side surface 821 being concave in a paraxial region thereof and an inner-side surface 822 being convex in a paraxial region thereof. The second lens element 820 is made of plastic material and has the outer-side surface 821 and the inner-side surface 822 being both aspheric. Each of the outer-side surface 821 and the inner-side surface 822 of the second lens element 820 has at least one inflection point. Each of the outer-side surface 821 and the inner-side surface 822 of the second lens element 820 has at least one critical point.

The third lens element 830 with positive refractive power has an outer-side surface 831 being convex in a paraxial region thereof and an inner-side surface 832 being concave in a paraxial region thereof. The third lens element 830 is made of plastic material and has the outer-side surface 831 and the inner-side surface 832 being both aspheric. Each of the outer-side surface 831 and the inner-side surface 832 of the third lens element 830 has at least one inflection point. The outer-side surface 831 of the third lens element 830 has at least one critical point.

The fourth lens element 840 with positive refractive power has an outer-side surface 841 being concave in a paraxial region thereof and an inner-side surface 842 being convex in a paraxial region thereof. The fourth lens element 840 is made of plastic material and has the outer-side surface 841 and the inner-side surface 842 being both aspheric. The outer-side surface 841 of the fourth lens element 840 has at least one inflection point and at least one critical point.

The light source 860 is disposed on or near the conjugate surface 850 of the lens system. The diffractive optical element 870 is made of silica. The diffractive optical element 870 and the cover glass 880 are located between the aperture stop 800 and the outer-side surface 811 of the first lens element 810, and will not affect the focal length of the lens system.

The detailed optical data of the 8th embodiment are shown in Table 15 and the aspheric surface data are shown in Table 16 below.

TABLE 15

8th Embodiment
f = 3.16 mm, Fno = 2.17, HFOV = 13.2 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 500.000 | | | | | |
| 1 | Ape. Stop | Plano | 0.015 | | | | | |
| 2 | DOE | Plano | 0.237 | Silica | 1.451 | 67.8 | — | — |
| 3 | | Plano | 0.015 | | | | | |
| 4 | Cover Glass | Plano | 0.299 | Glass | 1.508 | 64.2 | — | — |
| 5 | | Plano | 0.080 | | | | | |
| 6 | Lens 1 | 1.100 (ASP) | 0.678 | Plastic | 1.594 | 26.0 | 1.18 | −118.8 |
| 7 | | −1.485 (ASP) | 0.099 | | | | | |
| 8 | Lens 2 | −0.567 (ASP) | 0.289 | Plastic | 1.634 | 20.4 | −0.97 | −117.0 |
| 9 | | −9.008 (ASP) | 0.098 | | | | | |
| 10 | Lens 3 | 0.488 (ASP) | 0.250 | Plastic | 1.626 | 21.5 | 4.32 | −117.5 |
| 11 | | 0.477 (ASP) | 1.237 | | | | | |
| 12 | Lens 4 | −11.866 (ASP) | 0.500 | Plastic | 1.617 | 23.5 | 2.60 | −110.0 |
| 13 | | −1.434 (ASP) | 0.122 | | | | | |
| 14 | Light Source | Plano | — | | | | | |

Note:
Reference wavelength is 940.0 nm.

TABLE 16

Aspheric Coefficients

| Surface # | 6 | 7 | 8 | 9 |
|---|---|---|---|---|
| k= | −1.2584E+00 | −7.8209E+00 | −6.5102E+00 | 6.5785E+01 |
| A4= | 8.9348E−02 | 3.7559E−01 | 6.6367E−01 | 1.3676E+00 |
| A6= | −2.0224E−01 | −2.1187E+00 | −2.0129E+00 | −6.4244E+00 |
| A8= | 4.0191E−01 | 6.9509E+00 | 7.2273E+00 | 2.8473E+01 |
| A10= | −8.9318E−01 | −8.6450E+00 | −9.0508E+00 | −6.5896E+01 |
| A12= | 5.5802E−01 | 3.6031E+00 | 4.1968E+00 | 6.6661E+01 |

| Surface # | 10 | 11 | 12 | 13 |
|---|---|---|---|---|
| k= | −1.9532E+00 | −9.8420E−01 | −9.9000E+01 | 1.1995E+00 |
| A4= | 5.2032E−03 | 3.4650E−01 | −9.2676E−02 | −1.7465E−01 |
| A6= | −1.9039E+00 | −6.8890E+00 | 8.0382E−01 | 1.4557E+00 |
| A8= | −3.9046E−01 | 1.7603E+01 | −2.5620E+00 | −4.0995E+00 |
| A10= | 4.1296E+00 | −1.9328E+01 | 4.4182E+00 | 6.0368E+00 |
| A12= | −4.3081E+00 | 4.2202E+00 | −2.8376E+00 | −3.2081E+00 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.16 | Σ|f/fi| | 7.90 |
| Fno | 2.17 | f/T34 | 2.56 |
| HFOV [deg.] | 13.2 | BL/f | 0.04 |
| λ [nm] | 940.0 | |R5/Y31| | 0.77 |
| Nmax | 1.634 | Y42/Y11 | 0.90 |
| ΣVdi | 91.4 | (Y42 × 2)/EPD | 1.13 |
| ΣCTi [mm] | 1.72 | Yp21/f | 0.09 |
| TD [mm] | 3.15 | Yp22/f | 0.03 |
| Ymax [mm] | 0.92 | — | — |

9th Embodiment

Figure 17:
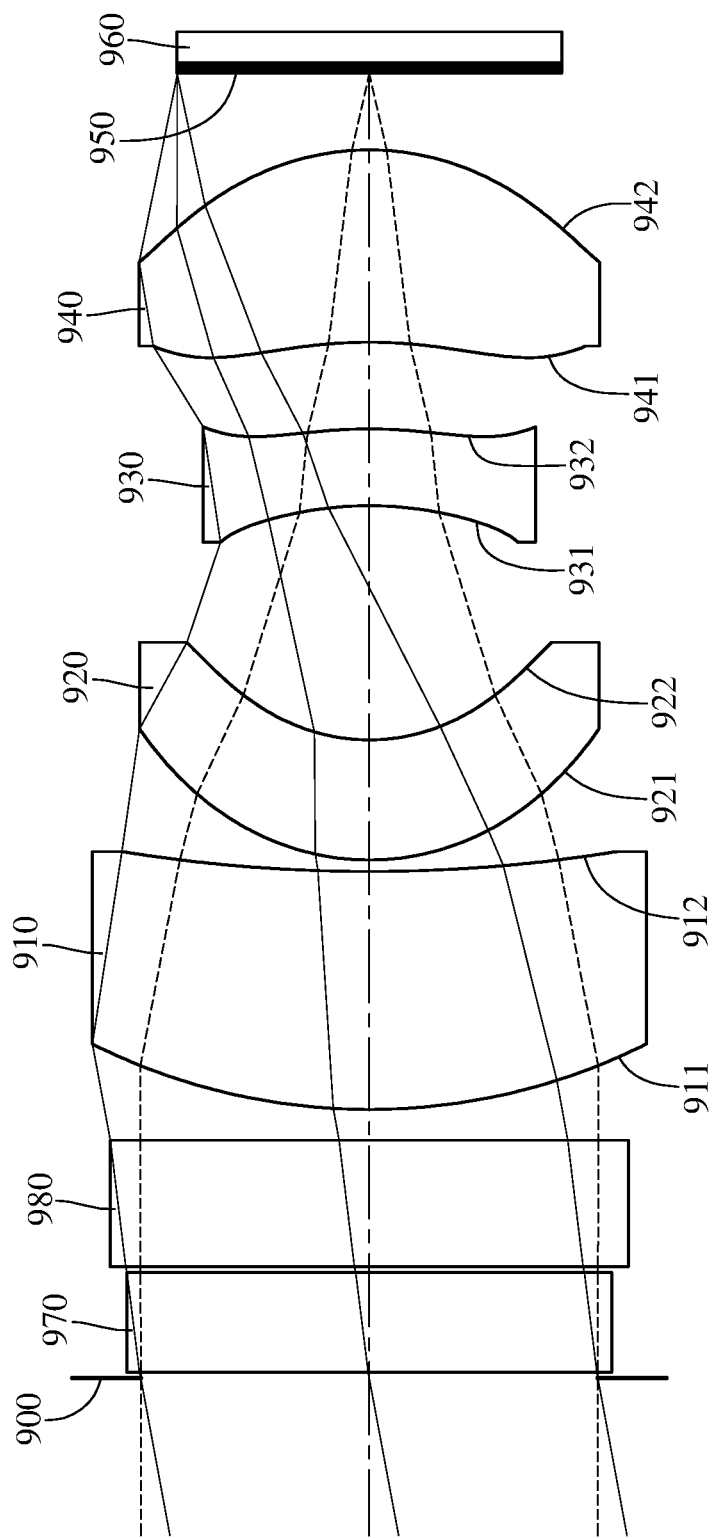
FIG. 17 is a schematic view of a projection device according to the 9th embodiment of the present disclosure.
Figure 18:
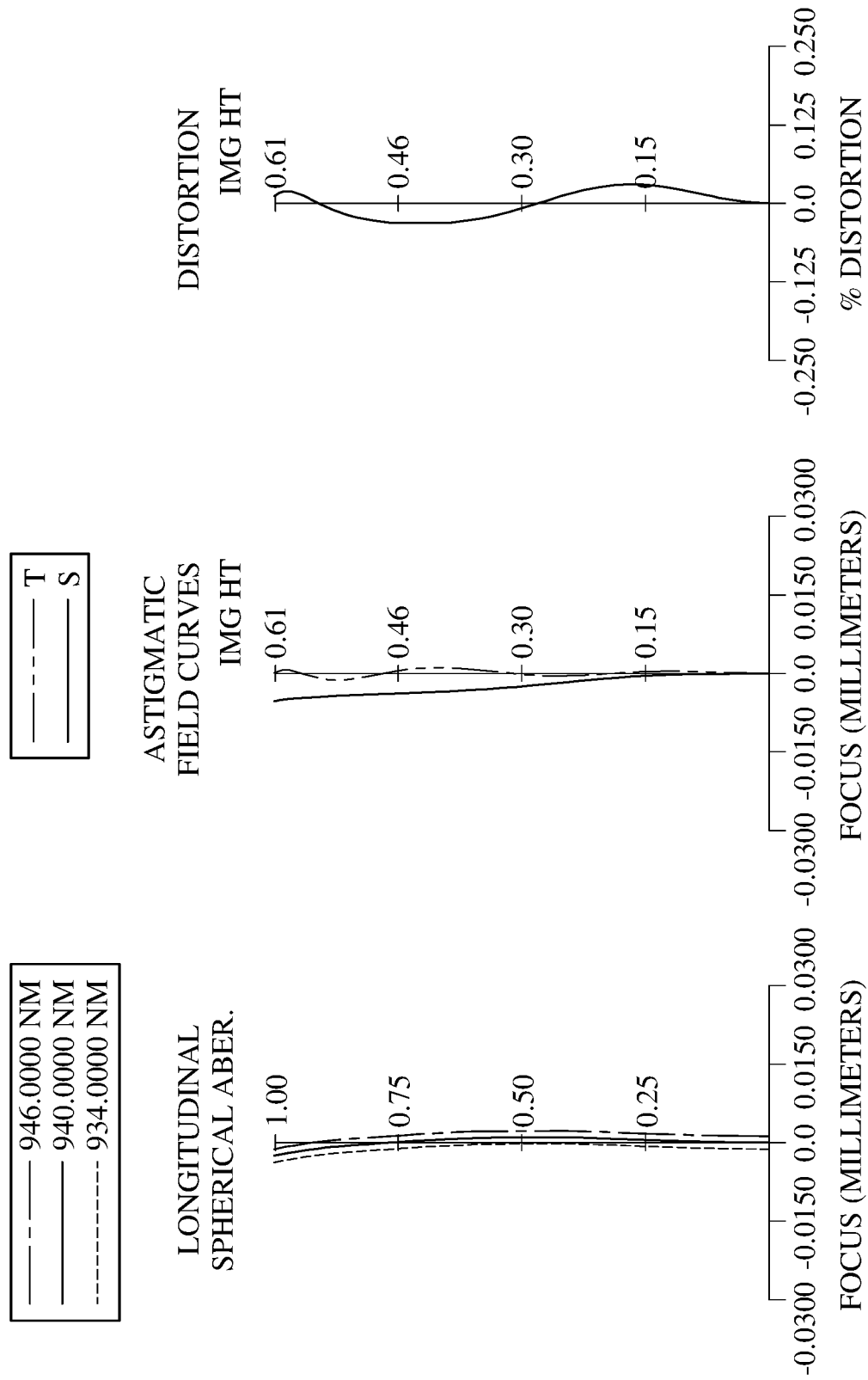
FIG. 18 shows spherical aberration curves, astigmatic field curves and a distortion curve of the projection device according to the 9th embodiment.

FIG. 17 is a schematic view of a projection device according to the 9th embodiment of the present disclosure. FIG. 18 shows, in order from left to right, spherical aberration curves, astigmatic field curves and a distortion curve of the projection device according to the 9th embodiment. In FIG. 17, the projection device includes the lens system (its reference numeral is omitted) of the present disclosure, a light source 960, a diffractive optical element 970 and a cover glass 980. The lens system includes, in order from an outer side to an inner side, an aperture stop 900, a first lens element 910, a second lens element 920, a third lens element 930, a fourth lens element 940 and a conjugate surface 950. The lens system includes four lens elements (910, 920, 930 and 940) with no additional lens element disposed between each of the adjacent four lens elements.

The first lens element 910 with positive refractive power has an outer-side surface 911 being convex in a paraxial region thereof and an inner-side surface 912 being concave in a paraxial region thereof. The first lens element 910 is made of glass material and has the outer-side surface 911 and the inner-side surface 912 being both spherical.

The second lens element 920 with negative refractive power has an outer-side surface 921 being convex in a paraxial region thereof and an inner-side surface 922 being concave in a paraxial region thereof. The second lens element 920 is made of plastic material and has the outer-side surface 921 and the inner-side surface 922 being both aspheric. The inner-side surface 922 of the second lens element 920 has at least one inflection point.

The third lens element 930 with negative refractive power has an outer-side surface 931 being concave in a paraxial region thereof and an inner-side surface 932 being convex in a paraxial region thereof. The third lens element 930 is made of plastic material and has the outer-side surface 931 and the inner-side surface 932 being both aspheric. The inner-side surface 932 of the third lens element 930 has at least one inflection point and at least one critical point.

The fourth lens element 940 with positive refractive power has an outer-side surface 941 being concave in a paraxial region thereof and an inner-side surface 942 being convex in a paraxial region thereof. The fourth lens element 940 is made of plastic material and has the outer-side surface 941 and the inner-side surface 942 being both aspheric. Each of the outer-side surface 941 and the inner-side surface 942 of the fourth lens element 940 has at least one inflection point. The outer-side surface 941 of the fourth lens element 940 has at least one critical point.

The light source 960 is disposed on or near the conjugate surface 950 of the lens system. The diffractive optical element 970 is made of silica. The diffractive optical element 970 and the cover glass 980 are located between the aperture stop 900 and the outer-side surface 911 of the first lens element 910, and will not affect the focal length of the lens system.

The detailed optical data of the 9th embodiment are shown in Table 17 and the aspheric surface data are shown in Table 18 below.

TABLE 17

9th Embodiment
f = 3.29 mm, Fno = 2.27, HFOV = 10.5 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 732.000 | | | | | |
| 1 | Ape. Stop | Plano | 0.018 | | | | | |
| 2 | DOE | Plano | 0.317 | Silica | 1.451 | 67.8 | — | — |
| 3 | | Plano | 0.018 | | | | | |
| 4 | Cover Glass | Plano | 0.403 | Glass | 1.508 | 64.2 | — | — |
| 5 | | Plano | 0.098 | | | | | |
| 6 | Lens 1 | 1.964 | 0.756 | Glass | 1.966 | 25.5 | 3.01 | 3.2 |
| 7 | | 4.912 | 0.037 | | | | | |
| 8 | Lens 2 | 0.793 (ASP) | 0.382 | Plastic | 1.634 | 20.4 | −20.41 | −117.0 |
| 9 | | 0.608 (ASP) | 0.744 | | | | | |
| 10 | Lens 3 | −1.130 (ASP) | 0.244 | Plastic | 1.634 | 20.4 | −10.14 | −117.0 |
| 11 | | −1.487 (ASP) | 0.276 | | | | | |
| 12 | Lens 4 | −1.465 (ASP) | 0.611 | Plastic | 1.535 | 56.0 | 2.65 | −106.1 |
| 13 | | −0.826 (ASP) | 0.244 | | | | | |
| 14 | Light Source | Plano | — | | | | | |

Note:
Reference wavelength is 940.0 nm.

TABLE 18

Aspheric Coefficients

| Surface # | 8 | 9 | 10 |
|---|---|---|---|
| k= | −5.6540E−01 | −1.1175E+00 | −1.3184E−01 |
| A4= | 9.7911E−02 | 4.8580E−01 | 2.4863E−01 |
| A6= | 4.6181E−02 | −7.3103E−02 | −2.2242E+00 |
| A8= | 2.2083E−01 | 1.9935E+00 | 2.0679E+01 |
| A10= | −2.7401E−01 | −7.2919E+00 | −1.1574E+02 |
| A12= | 7.7990E−02 | −4.1882E+00 | 9.6932E+01 |

| Surface # | 11 | 12 | 13 |
|---|---|---|---|
| k= | −3.0284E+01 | 1.8945E+00 | −5.9682E−02 |
| A4= | −6.4304E−02 | 6.3669E−01 | 1.1271E−01 |
| A6= | 5.2059E+00 | −8.7510E−01 | −4.3700E−01 |
| A8= | −7.9275E+00 | 8.2904E+00 | 1.9741E+00 |
| A10= | 1.8318E+01 | −1.6693E+01 | −3.4329E+00 |
| A12= | −5.3225E+01 | 1.0725E+01 | 4.0270E+00 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.29 | Σ|f/fi| | 2.82 |
| Fno | 2.27 | f/T34 | 11.93 |
| HFOV [deg.] | 10.5 | BL/f | 0.07 |
| λ [nm] | 940.0 | |R5/Y31| | 2.40 |
| Nmax | 1.966 | Y42/Y11 | 0.83 |
| ΣVdi | 122.3 | (Y42 × 2)/EPD | 1.01 |
| ΣCTi [mm] | 1.99 | Yp21/f | — |
| TD [mm] | 3.05 | Yp22/f | 0.16 |
| Ymax [mm] | 0.88 | — | — |

10th Embodiment

Figure 19:
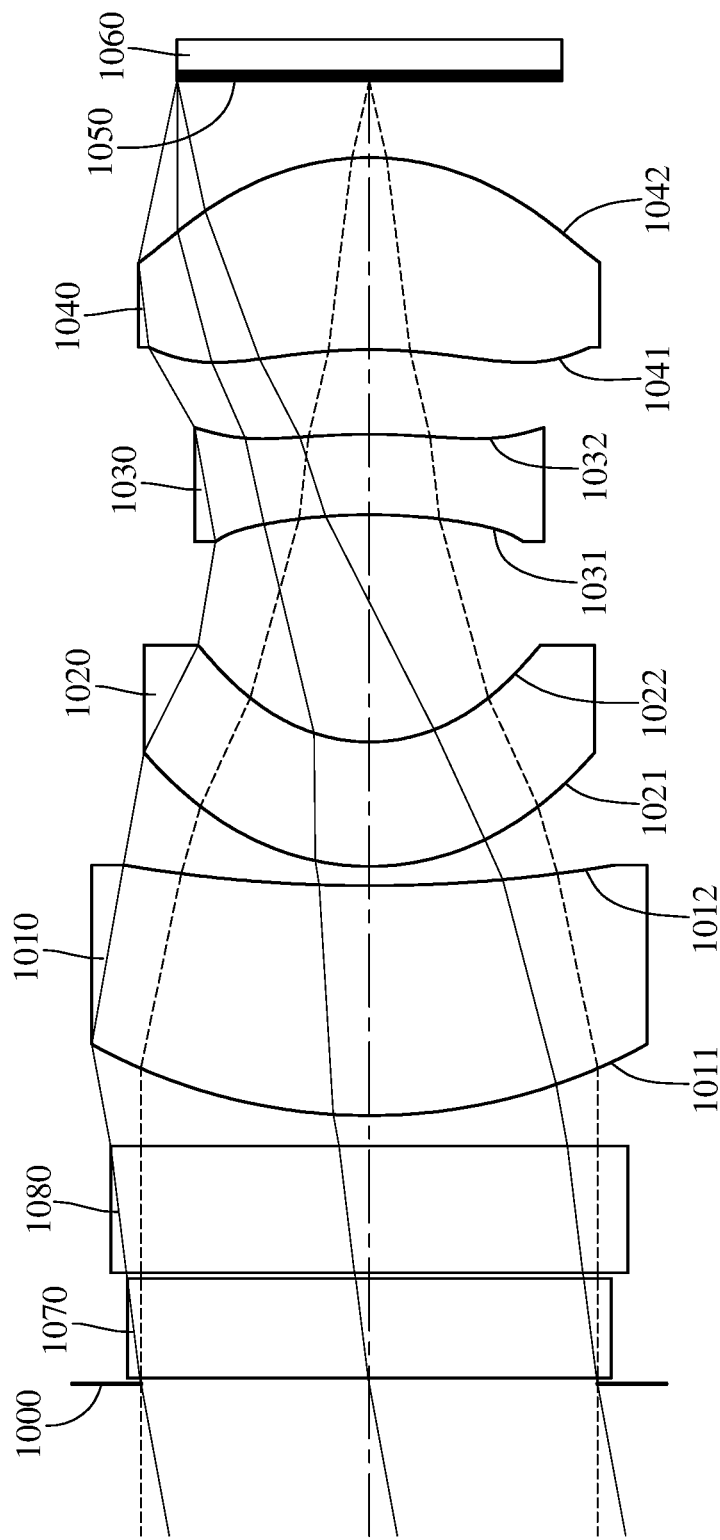
FIG. 19 is a schematic view of a projection device according to the 10th embodiment of the present disclosure.
Figure 20:
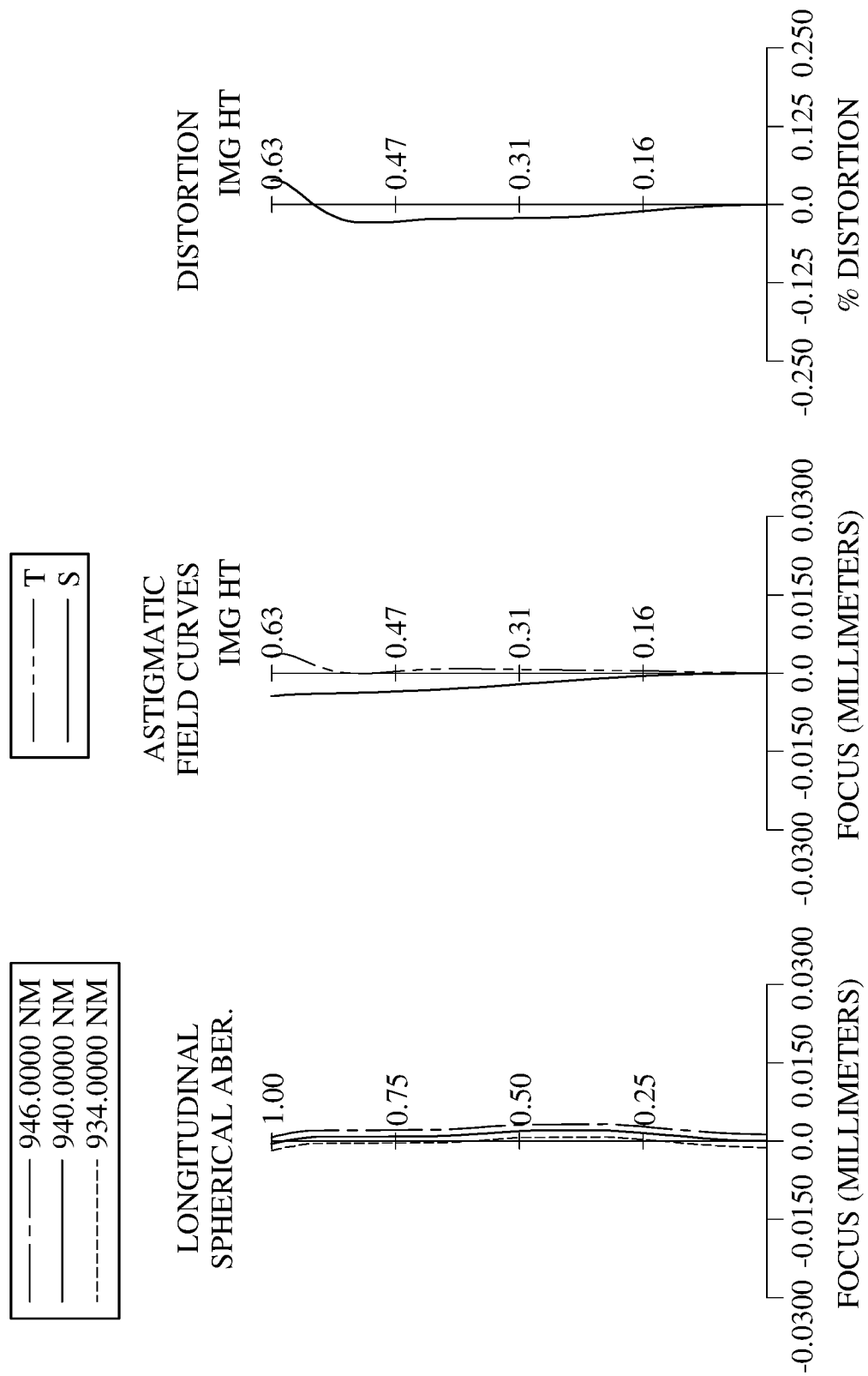
FIG. 20 shows spherical aberration curves, astigmatic field curves and a distortion curve of the projection device according to the 10th embodiment.

FIG. 19 is a schematic view of a projection device according to the 10th embodiment of the present disclosure. FIG. 20 shows, in order from left to right, spherical aberration curves, astigmatic field curves and a distortion curve of the projection device according to the 10th embodiment. In FIG. 19, the projection device includes the lens system (its reference numeral is omitted) of the present disclosure, a light source 1060, a diffractive optical element 1070 and a cover glass 1080. The lens system includes, in order from an outer side to an inner side, an aperture stop 1000, a first lens element 1010, a second lens element 1020, a third lens element 1030, a fourth lens element 1040 and a conjugate surface 1050. The lens system includes four lens elements (1010, 1020, 1030 and 1040) with no additional lens element disposed between each of the adjacent four lens elements.

The first lens element 1010 with positive refractive power has an outer-side surface 1011 being convex in a paraxial region thereof and an inner-side surface 1012 being concave in a paraxial region thereof. The first lens element 1010 is made of glass material and has the outer-side surface 1011 and the inner-side surface 1012 being both spherical.

The second lens element 1020 with negative refractive power has an outer-side surface 1021 being convex in a paraxial region thereof and an inner-side surface 1022 being concave in a paraxial region thereof. The second lens element 1020 is made of plastic material and has the outer-side surface 1021 and the inner-side surface 1022 being both aspheric.

The third lens element 1030 with negative refractive power has an outer-side surface 1031 being concave in a paraxial region thereof and an inner-side surface 1032 being convex in a paraxial region thereof. The third lens element 1030 is made of plastic material and has the outer-side surface 1031 and the inner-side surface 1032 being both aspheric. The inner-side surface 1032 of the third lens element 1030 has at least one inflection point and at least one critical point.

The fourth lens element 1040 with positive refractive power has an outer-side surface 1041 being concave in a paraxial region thereof and an inner-side surface 1042 being convex in a paraxial region thereof. The fourth lens element 1040 is made of plastic material and has the outer-side surface 1041 and the inner-side surface 1042 being both aspheric. Each of the outer-side surface 1041 and the inner-side surface 1042 of the fourth lens element 1040 has at least one inflection point. The outer-side surface 1041 of the fourth lens element 1040 has at least one critical point.

The light source 1060 is disposed on or near the conjugate surface 1050 of the lens system. The diffractive optical element 1070 is made of silica. The diffractive optical element 1070 and the cover glass 1080 are located between the aperture stop 1000 and the outer-side surface 1011 of the first lens element 1010, and will not affect the focal length of the lens system.

The detailed optical data of the 10th embodiment are shown in Table 19 and the aspheric surface data are shown in Table 20 below.

TABLE 19

10th Embodiment
f = 3.40 mm, Fno = 2.27, HFOV = 10.5 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 756.000 | | | | | |
| 1 | Ape. Stop | Plano | 0.019 | | | | | |
| 2 | DOE | Plano | 0.328 | Silica | 1.451 | 67.8 | — | — |
| 3 | | Plano | 0.019 | | | | | |
| 4 | Cover Glass | Plano | 0.416 | Glass | 1.508 | 64.2 | — | — |
| 5 | | Plano | 0.101 | | | | | |
| 6 | Lens 1 | 1.891 | 0.756 | Glass | 1.966 | 25.5 | 2.85 | 3.2 |
| 7 | | 4.850 | 0.063 | | | | | |
| 8 | Lens 2 | 0.842 (ASP) | 0.410 | Plastic | 1.634 | 20.4 | −6.81 | −117.0 |
| 9 | | 0.572 (ASP) | 0.747 | | | | | |
| 10 | Lens 3 | −1.896 (ASP) | 0.265 | Plastic | 1.634 | 20.4 | −24.80 | −117.0 |
| 11 | | −2.272 (ASP) | 0.278 | | | | | |
| 12 | Lens 4 | −1.704 (ASP) | 0.631 | Plastic | 1.535 | 56.0 | 2.72 | −106.1 |
| 13 | | −0.886 (ASP) | 0.252 | | | | | |
| 14 | Light Source | Plano | — | | | | | |

Note:
Reference wavelength is 940.0 nm.

TABLE 20

Aspheric Coefficients

| Surface # | 8 | 9 | 10 |
|---|---|---|---|
| k= | −7.6922E−01 | −9.7888E−01 | 3.6951E−01 |
| A4= | 8.9115E−02 | 4.1375E−01 | 1.2575E−01 |
| A6= | 1.0811E−01 | 3.9869E−01 | −9.1451E−01 |
| A8= | −1.9393E−01 | −4.1744E−01 | 5.8024E+00 |
| A10= | 1.4034E−01 | −2.8902E+00 | −3.4377E+01 |

| Surface # | 11 | 12 | 13 |
|---|---|---|---|
| k= | 4.4648E+00 | 1.2831E+00 | 6.2063E−03 |
| A4= | 8.2668E−01 | 4.7084E−01 | 4.9560E−02 |
| A6= | −3.9448E−01 | −4.2016E−01 | 8.7141E−02 |
| A8= | 1.1866E+01 | 5.5071E+00 | −4.1080E−02 |
| A10= | −3.8721E+01 | −1.1334E+01 | 3.7008E−01 |
| A12= | 2.8948E+01 | 7.0299E+00 | 8.4198E−01 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.40 | Σ|f/fi| | 3.08 |
| Fno | 2.27 | f/T34 | 12.20 |
| HFOV [deg.] | 10.5 | BL/f | 0.07 |
| λ [nm] | 940.0 | |R5/Y31| | 3.75 |
| Nmax | 1.966 | Y42/Y11 | 0.83 |
| ΣVdi | 122.3 | (Y42 × 2)/EPD | 1.01 |
| ΣCTi [mm] | 2.06 | Yp21/f | — |
| TD [mm] | 3.15 | Yp22/f | — |
| Ymax [mm] | 0.91 | — | — |

11th Embodiment

Figure 21:
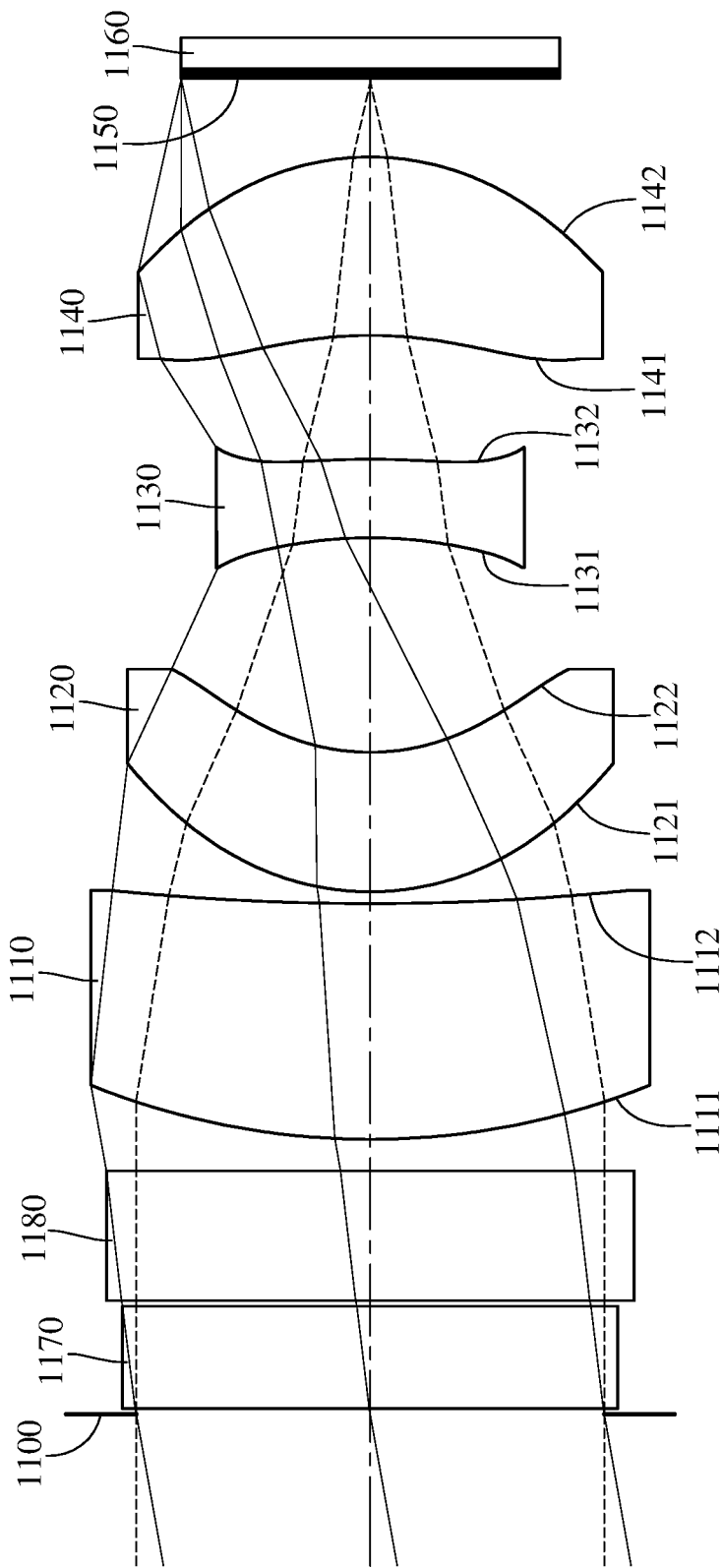
FIG. 21 is a schematic view of a projection device according to the 11th embodiment of the present disclosure.
Figure 22:
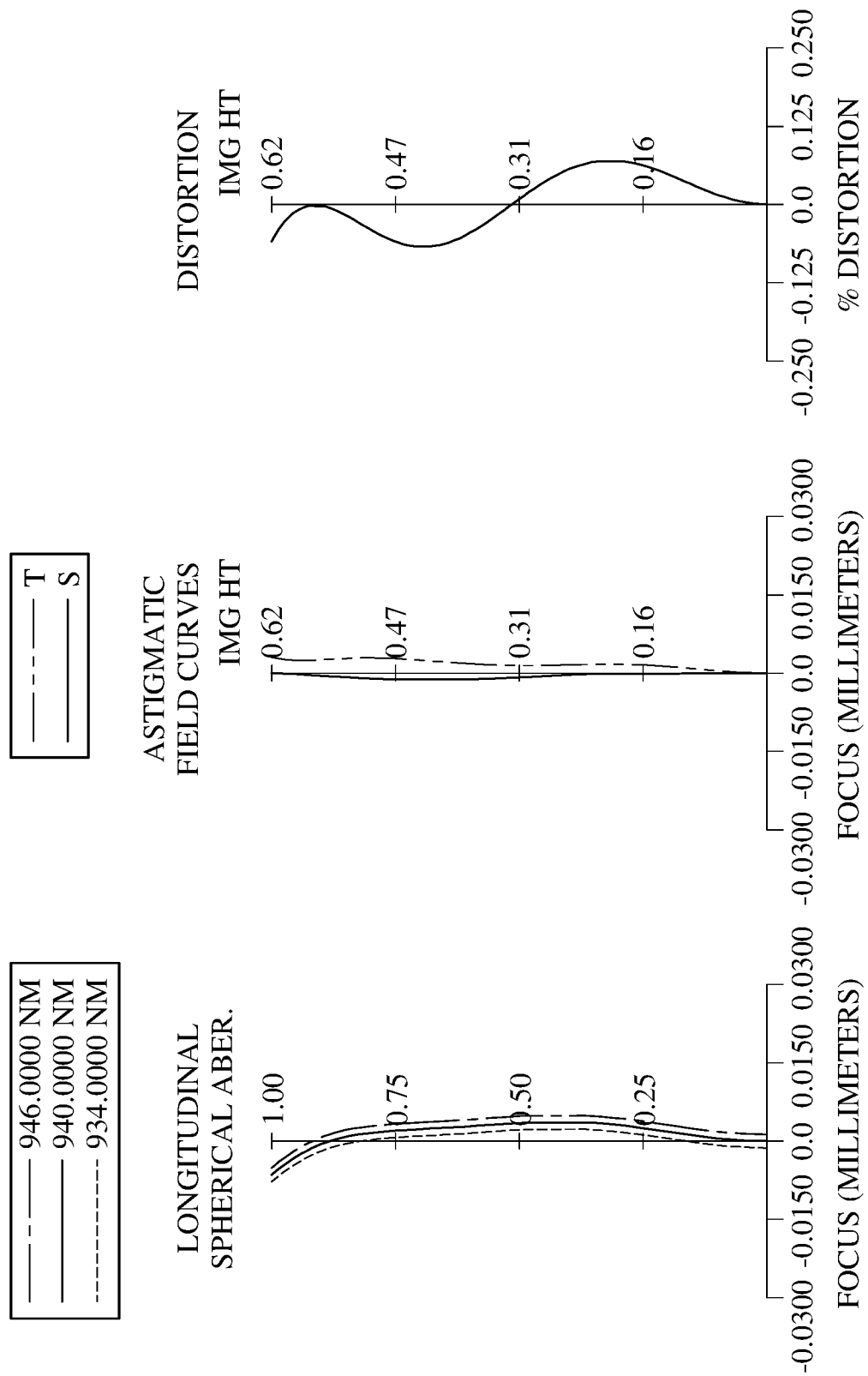
FIG. 22 shows spherical aberration curves, astigmatic field curves and a distortion curve of the projection device according to the 11th embodiment.

FIG. 21 is a schematic view of a projection device according to the 11th embodiment of the present disclosure. FIG. 22 shows, in order from left to right, spherical aberration curves, astigmatic field curves and a distortion curve of the projection device according to the 11th embodiment. In FIG. 21, the projection device includes the lens system (its reference numeral is omitted) of the present disclosure, a light source 1160, a diffractive optical element 1170 and a cover glass 1180. The lens system includes, in order from an outer side to an inner side, an aperture stop 1100, a first lens element 1110, a second lens element 1120, a third lens element 1130, a fourth lens element 1140 and a conjugate surface 1150. The lens system includes four lens elements (1110, 1120, 1130 and 1140) with no additional lens element disposed between each of the adjacent four lens elements.

The first lens element 1110 with positive refractive power has an outer-side surface 1111 being convex in a paraxial region thereof and an inner-side surface 1112 being concave in a paraxial region thereof. The first lens element 1110 is made of glass material and has the outer-side surface 1111 and the inner-side surface 1112 being both spherical.

The second lens element 1120 with positive refractive power has an outer-side surface 1121 being convex in a paraxial region thereof and an inner-side surface 1122 being concave in a paraxial region thereof. The second lens element 1120 is made of plastic material and has the outer-side surface 1121 and the inner-side surface 1122 being both aspheric. The inner-side surface 1122 of the second lens element 1120 has at least one inflection point.

The third lens element 1130 with negative refractive power has an outer-side surface 1131 being concave in a paraxial region thereof and an inner-side surface 1132 being convex in a paraxial region thereof. The third lens element 1130 is made of plastic material and has the outer-side surface 1131 and the inner-side surface 1132 being both aspheric. The inner-side surface 1132 of the third lens element 1130 has at least one inflection point and at least one critical point.

The fourth lens element 1140 with positive refractive power has an outer-side surface 1141 being concave in a paraxial region thereof and an inner-side surface 1142 being convex in a paraxial region thereof. The fourth lens element 1140 is made of plastic material and has the outer-side surface 1141 and the inner-side surface 1142 being both aspheric. Each of the outer-side surface 1141 and the inner-side surface 1142 of the fourth lens element 1140 has at least one inflection point. The outer-side surface 1141 of the fourth lens element 1140 has at least one critical point.

The light source 1160 is disposed on or near the conjugate surface 1150 of the lens system. The diffractive optical element 1170 is made of silica. The diffractive optical element 1170 and the cover glass 1180 are located between the aperture stop 1100 and the outer-side surface 1111 of the first lens element 1110, and will not affect the focal length of the lens system.

The detailed optical data of the 11th embodiment are shown in Table 21 and the aspheric surface data are shown in Table 22 below.

TABLE 21

11th Embodiment
f = 3.51 mm, Fno = 2.27, HFOV = 10.1 deg.

| Surface # | | Curvature Radius | Thickness | Material | Index | Abbe # | Focal Length | dn/dt × $10^{-6}$ |
|---|---|---|---|---|---|---|---|---|
| 0 | Object | Plano | 780.000 | | | | | |
| 1 | Ape. Stop | Plano | 0.020 | | | | | |
| 2 | DOE | Plano | 0.338 | Silica | 1.451 | 67.8 | — | — |
| 3 | | Plano | 0.020 | | | | | |
| 4 | Cover Glass | Plano | 0.429 | Glass | 1.508 | 64.2 | — | — |
| 5 | | Plano | 0.104 | | | | | |
| 6 | Lens 1 | 2.470 | 0.780 | Glass | 1.966 | 25.5 | 3.39 | 3.2 |
| 7 | | 8.444 | 0.039 | | | | | |
| 8 | Lens 2 | 0.893 (ASP) | 0.462 | Plastic | 1.634 | 20.4 | 105.72 | −117.0 |
| 9 | | 0.724 (ASP) | 0.710 | | | | | |
| 10 | Lens 3 | −1.442 (ASP) | 0.260 | Plastic | 1.634 | 20.4 | −5.85 | −117.0 |
| 11 | | −2.525 (ASP) | 0.410 | | | | | |
| 12 | Lens 4 | −1.396 (ASP) | 0.590 | Plastic | 1.634 | 20.4 | 2.65 | −117.0 |
| 13 | | −0.888 (ASP) | 0.260 | | | | | |
| 14 | Light Source | Plano | — | | | | | |

Note:
Reference wavelength is 940.0 nm.

TABLE 22

| Aspheric Coefficients | | | |
|---|---|---|---|
| Surface # | 8 | 9 | 10 |
| k= | −7.4042E−01 | −1.2715E+00 | 1.7560E+00 |
| A4= | 8.8605E−02 | 2.7277E−01 | 3.6057E−01 |
| A6= | 5.1599E−02 | −5.1685E−01 | −1.1735E+00 |
| A8= | −4.1526E−02 | 2.0548E+00 | 1.0126E+01 |
| A10= | 1.2006E−01 | −1.0372E+00 | −8.3069E+01 |
| A12= | −1.9812E−01 | 1.0396E+01 | 1.4602E+02 |
| Surface # | 11 | 12 | 13 |
| k= | −9.9000E+01 | −1.5505E−01 | −6.1244E−01 |
| A4= | 2.0717E−01 | 2.0516E−01 | −2.9840E−02 |
| A6= | 5.3062E+00 | 5.4615E−01 | −4.7154E−01 |
| A8= | −1.4663E+01 | 2.3283E−01 | 2.0970E+00 |
| A10= | 3.3331E+01 | −5.9584E−01 | −4.1350E+00 |
| A12= | −2.6725E+01 | 1.1704E−02 | 3.0392E+00 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.51 | Σ\|f/fi\| | 2.99 |
| Fno | 2.27 | f/T34 | 8.56 |
| HFOV [deg.] | 10.1 | BL/f | 0.07 |
| λ [nm] | 940.0 | \|R5/Y31\| | 2.87 |
| Nmax | 1.966 | Y42/Y11 | 0.83 |
| ΣVdi | 86.7 | (Y42 × 2)/EPD | 0.99 |
| ΣCTi [mm] | 2.09 | Yp21/f | — |
| TD [mm] | 3.25 | Yp22/f | 0.15 |
| Ymax [mm] | 0.92 | — | — |

12th Embodiment

FIG. 23 is a schematic view of a detecting module according to the 12th embodiment of the present disclosure. In this embodiment, a detecting module 10 includes a receiving device 11 and a projection device 12 disclosed in the first embodiment. The receiving device 11 includes an imaging lens assembly 11a and an image sensor 11b.

The projection device 12 includes a lens system 12a and a light source 160 featuring with high directional characteristic (low divergence) and high intensity. The light source 160 can be a laser, a superluminescent diode (SLED), a micro LED, a resonant cavity light emitting diode (RCLED), a VCSEL and the like. The light source 160 can be a single light source or multiple light sources disposed on the conjugate surface 150 on the inner side of the lens system 12a to present good projection quality. In a case that the light source 160 of the projection device 12 is a VCSEL disposed on the conjugate surface 150, the light source 160 is favorable for the projection device 12 emitting high directional light rays having low divergence and high intensity so as to enhance the illuminance of the conjugate surface on an outer side of the lens system 12a. The light source 160 of the projection device 12 projects a light onto a detected object O. The detected object O reflects the light, and the reflected light travels into the receiving device 11. The light traveling into the receiving device 11 passes through the imaging lens assembly 11a and then is incident on the image sensor 11b.

The diffractive optical element 170 of the projection device 12 helps project the light evenly onto the detected object O, or helps diffract the light to enlarge the projection angle and the projection field. The diffractive optical element 170 can be a diffuser, a raster or a combination thereof (but not limited thereto). The diffractive optical element 170 can have a micro structure such as a diffraction grating for scattering the light and replicating a speckle pattern generated by the scattered light, thereby enlarging the projection angle.

The present disclosure is not limited to the detecting module 10 in FIG. 23. For example, the detecting module can include a focusing system or a focusing lens assembly. The focusing system is configured to adjust the focal lengths of the lens system 12a and the imaging lens assembly 11a according to different photographing conditions so as to provide high image resolution. The detecting module can include a lens assembly with reflection functionality in order to reduce the size of the detecting module, thereby improving the space utilization.

13th Embodiment

Figure 24:
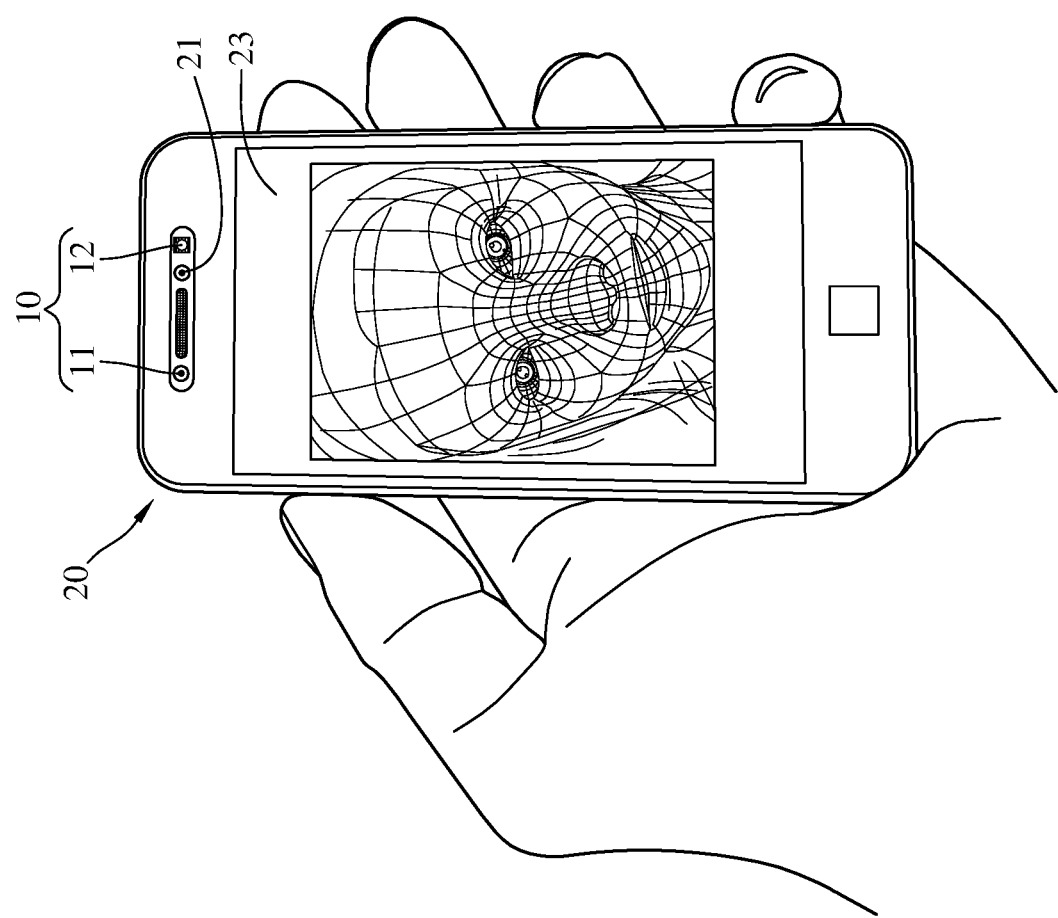
FIG. 24 is a schematic view of an electronic device according to the 13th embodiment of the present disclosure.
Figure 25:
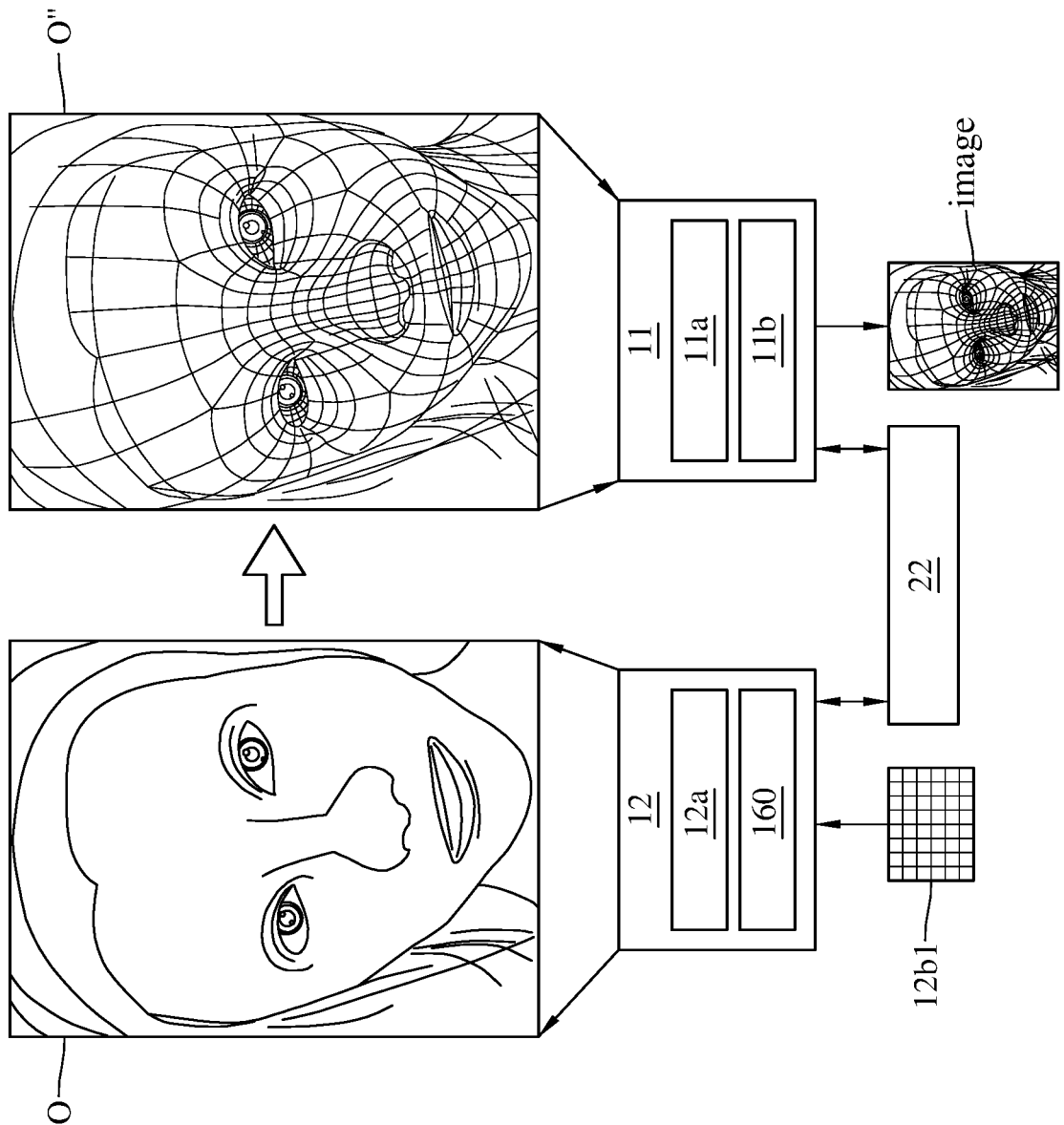
FIG. 25 is a schematic view of the detection of a 3D facial profile by using the electronic device in FIG. 24.

FIG. 24 is a schematic view of an electronic device according to the 13th embodiment of the present disclosure. FIG. 25 is a schematic view of the detection of a 3D facial profile by using the electronic device in FIG. 24. In this embodiment, an electronic device 20 is a smartphone including an image capturing unit 21, an image signal processor 22 and the detecting module 10 disclosed in the 12th embodiment. The image capturing unit 21 can include a conventional photographing lens assembly.

A laser array 12b1 is used as the light source 160 of projection device 12 of the detecting module 10 in order to form specific light patterns. In detail, the light passes through the lens system 12a of the projection device 12 to generate structured light, which is projected onto a human face (the detected object O). The structured light can be in the shape of dots, spots or stripes, but the present disclosure is not limited thereto. The structured light projected onto the human face generates a 3D face structure O" corresponding to the facial surface of the human subject.

The imaging lens assembly 11a of the receiving device 11 receives the light (the 3D face structure O") reflected off the subject's face, and projected on the image sensor 11b to generate a corresponding image. The image signal processor 22 is configured to analyze information of the image to obtain a relative distance between different parts of the subject's face, thereby determining a 3D profile of the subject's face. Moreover, after the information of the image is analyzed by the image signal processor 22, an analyzed human facial image can be displayed on a screen 23 of the electronic device 20.

Figure 26:
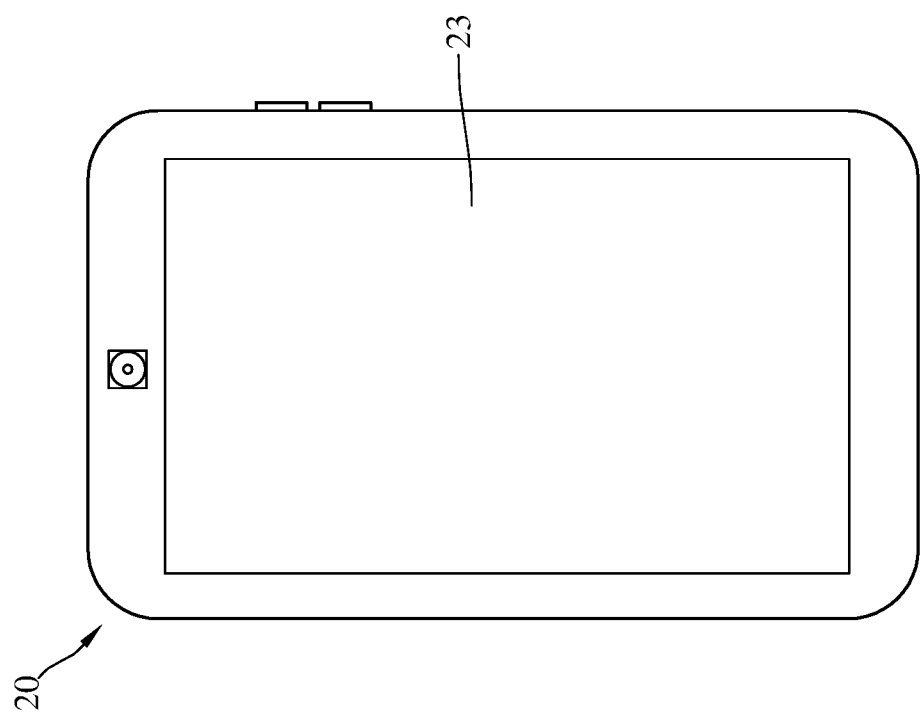
FIG. 26 and FIG. 27 are schematic views of an electronic device according to another embodiment of the present disclosure.
Figure 27:
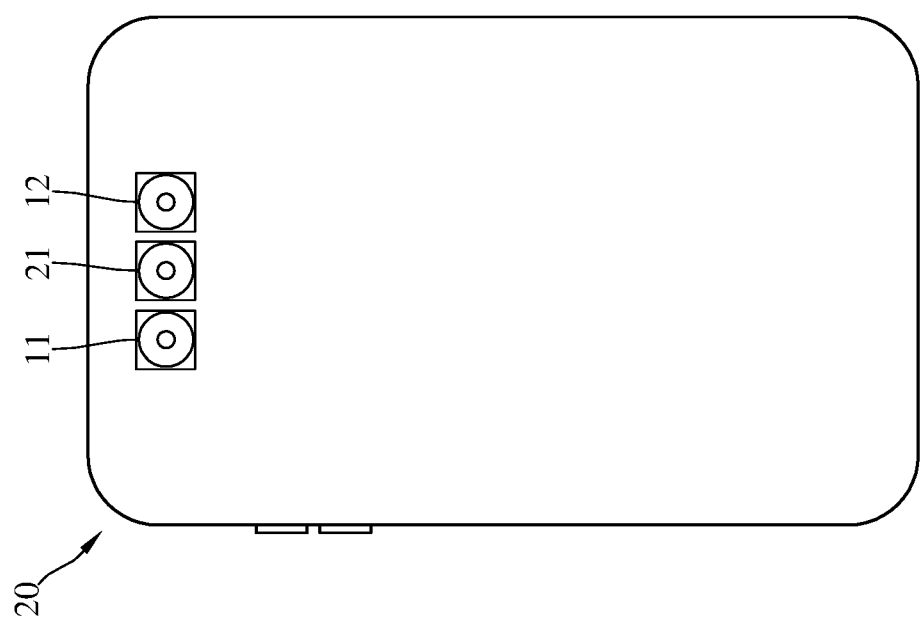

In FIG. 24, the detecting module 10, the image capturing unit 21 and the screen 23 are arranged on the same side of the electronic device 20, but the present disclosure is not limited thereto. FIG. 26 and FIG. 27 are schematic views of an electronic device according to another embodiment of the present disclosure. In some cases, the receiving device 11, the projection device 12 and the image capturing unit 21 are arranged on one side of the electronic device 20, while the screen 23 is arranged on the opposite side of the electronic device 20.

14th Embodiment

Figure 28:
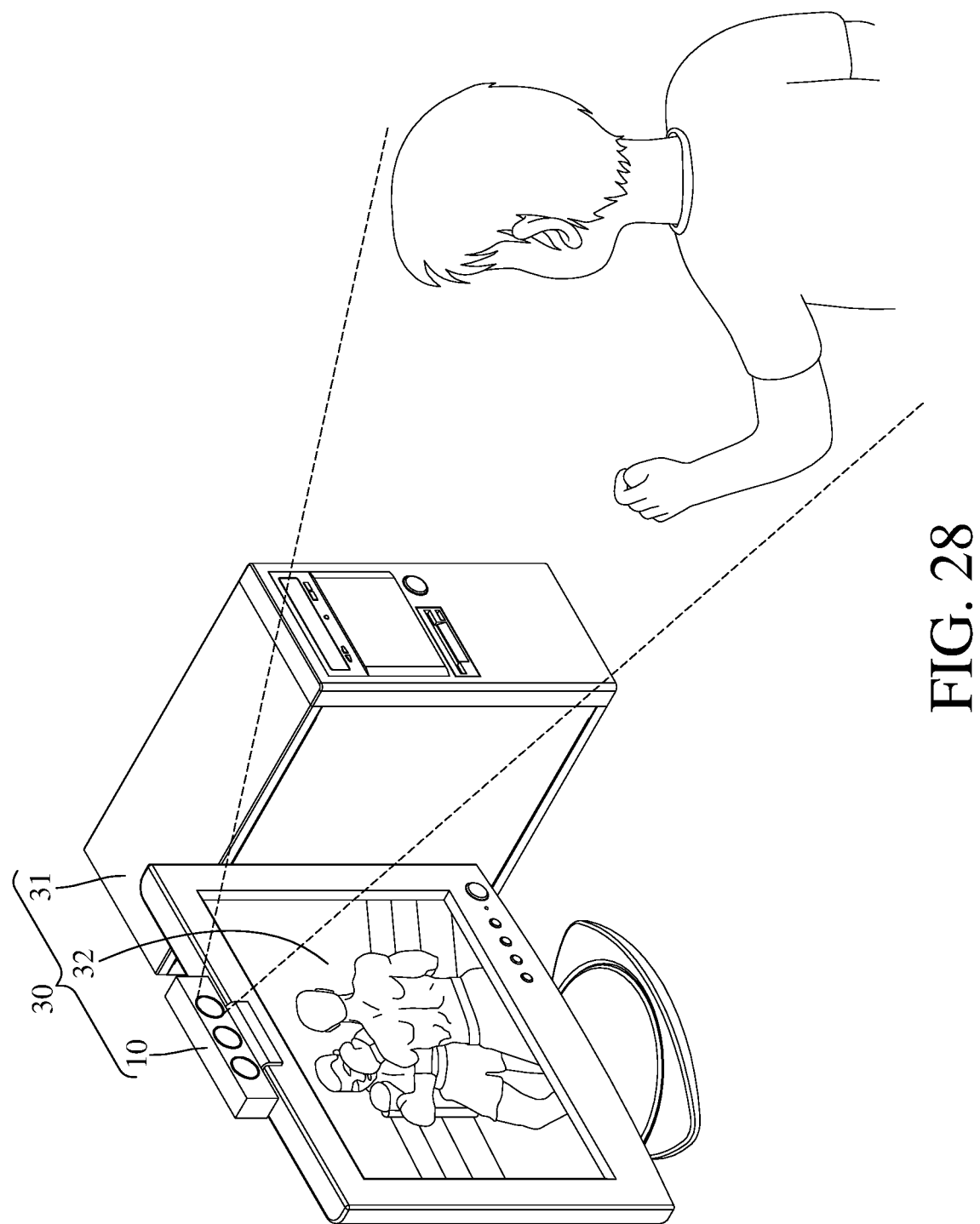
FIG. 28 is a schematic view of an image recognition device according to the 14th embodiment of the present disclosure.

FIG. 28 is a schematic view of an image recognition device according to the 14th embodiment of the present disclosure. In this embodiment, an image recognition device 30 includes a host computer 31, a display unit 32 and the detecting module 10 disclosed in the 12th embodiment.

The display unit 32 is electrically connected to the host computer 31, and the detecting module 10 is electrically connected to the host computer 31 and the display unit 32. The image recognition device 30 captures an image of a user by the detecting module 10, and provides the functionality of motion detection and facial recognition by image processing software installed in the host computer 31.

The smartphone (such as the electronic device 20 shown in the 13th embodiment) is only exemplary for showing the detecting module 10 installed in an electronic device, and the present disclosure is not limited thereto. The detecting module 10 can be optionally applied to optical systems with a movable focus. Furthermore, the lens system and the imaging lens assembly of the detecting module 10 feature good aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device comprising:
  a lens system comprising four lens elements which are, in order from an outer side to an inner side, a first lens element, a second lens element, a third lens element and a fourth lens element;
  wherein the first lens element has an outer-side surface being convex in a paraxial region thereof, the second lens element with negative refractive power has an outer-side surface being convex in a paraxial region thereof and an inner-side surface being concave in a paraxial region thereof, and each of at least two lens elements of the lens system has an Abbe number smaller than 22.0;
  wherein a maximum effective radius of an inner-side surface of the fourth lens element is Y42, an entrance pupil diameter of the lens system is EPD, an Abbe number of the i-th lens element is Vdi, and the following conditions are satisfied:

$0.10 < (Y42 \times 2)/EPD < 1.20$; and $40.0 < \Sigma Vdi < 150.0$, wherein $i=1, 2, 3, 4$.

2. The electronic device of claim 1, wherein the first lens element has positive refractive power, and the fourth lens element has positive refractive power.

3. The electronic device of claim 1, wherein a maximum effective radius of the outer-side surface of the first lens element is Y11, the maximum effective radius of the inner-side surface of the fourth lens element is Y42, and the following condition is satisfied:

$0.30 < Y42/Y11 < 1.0$.

4. The electronic device of claim 1, wherein the Abbe number of the i-th lens element is Vdi, and the following condition is satisfied:

$40.0 < \Sigma Vdi < 135.0$, wherein $i=1, 2, 3, 4$.

5. The electronic device of claim 1, wherein a sum of central thicknesses of lens elements of the lens system ranges from 0.50 mm to 3.0 mm.

6. The electronic device of claim 1, wherein at least half of lens elements of the lens system are made of plastic material, and each of the plastic lens elements has two aspheric surfaces.

7. The electronic device of claim 1, further comprising an aperture stop disposed on the outer side of the first lens element.

8. The electronic device of claim 1, wherein each of at least three lens elements of the lens system has an Abbe number smaller than 26.0.

9. An electronic device comprising:
  a lens system comprising four lens elements which are, in order from an outer side to an inner side, a first lens element, a second lens element, a third lens element and a fourth lens element;
  wherein the second lens element has an outer-side surface being convex in a paraxial region thereof, each of at least two lens elements of the lens system has an Abbe number smaller than 22.0, and the lens system further comprises an aperture stop disposed on the outer side of the second lens element;
  wherein a maximum effective radius of an inner-side surface of the fourth lens element is Y42, an entrance pupil diameter of the lens system is EPD, an Abbe number of the i-th lens element is Vdi, and the following conditions are satisfied:

$0.10 < (Y42 \times 2)/EPD < 1.20$; and $86.7 \leq \Sigma Vdi < 150.0$, wherein $i=1, 2, 3, 4$.

10. The electronic device of claim 9, wherein the second lens element has an inner-side surface being concave in a paraxial region thereof.

11. The electronic device of claim 9, wherein the third lens element has an outer-side surface being concave in a paraxial region thereof.

12. The electronic device of claim 9, wherein the first lens element with positive refractive power has an outer-side surface being convex in a paraxial region thereof and an inner-side surface being concave in a paraxial region thereof.

13. The electronic device of claim 9, wherein a vertical distance between an inflection point closest to an optical axis on any surface of the second lens element and the optical axis is Yp2x, a focal length of the lens system is f, and the following condition is satisfied:

$0.01 < Yp2x/f < 1.0$, wherein $x=1$ or 2.

14. The electronic device of claim 9, wherein a maximum effective radius of an outer-side surface of the first lens element is Y11, the maximum effective radius of the inner-side surface of the fourth lens element is Y42, and the following condition is satisfied:

$$0.30<Y42/Y11<1.0.$$

15. The electronic device of claim 9, wherein a curvature radius of an outer-side surface of the fourth lens element has the same sign as a curvature radius of the inner-side surface of the fourth lens element.

16. The electronic device of claim 9, wherein the lens system is operated within a wavelength range from 750 nm to 1500 nm.

17. An electronic device comprising:
a lens system comprising four lens elements which are, in order from an outer side to an inner side, a first lens element, a second lens element, a third lens element and a fourth lens element;
wherein the third lens element with negative refractive power has an outer-side surface being concave in a paraxial region thereof and an inner-side surface being convex in a paraxial region thereof, and each of at least two lens elements of the lens system has an Abbe number smaller than 22.0;
wherein a maximum effective radius of an inner-side surface of the fourth lens element is Y42, an entrance pupil diameter of the lens system is EPD, and the following condition is satisfied:

$$0.10<(Y42\times2)/EPD<1.20.$$

18. The electronic device of claim 17, wherein the fourth lens element has positive refractive power, a maximum effective radius of an outer-side surface of the first lens element is Y11, the maximum effective radius of the inner-side surface of the fourth lens element is Y42, and the following condition is satisfied:

$$0.10<Y42/Y11<2.0.$$

19. The electronic device of claim 17, wherein the first lens element has positive refractive power, a maximum effective radius of an outer-side surface of the first lens element is Y11, the maximum effective radius of the inner-side surface of the fourth lens element is Y42, and the following condition is satisfied:

$$0.30<Y42/Y11<1.0.$$

20. The electronic device of claim 17, wherein at least half of lens elements of the lens system are made of plastic material, each of the plastic lens elements has two aspheric surfaces, an Abbe number of the i-th lens element is Vdi, and the following condition is satisfied:

$$40.0<\Sigma Vdi<150.0, \text{ wherein } i=1, 2, 3, 4.$$

21. The electronic device of claim 17, wherein a curvature radius of an outer-side surface of the fourth lens element has the same sign as a curvature radius of the inner-side surface of the fourth lens element.

22. An electronic device comprising:
a lens system comprising four lens elements which are, in order from an outer side to an inner side, a first lens element, a second lens element, a third lens element and a fourth lens element;
wherein the first lens element has positive refractive power, the second lens element has an inner-side surface being concave in a paraxial region thereof, at least one surface of the second lens element is aspheric, the third lens element with negative refractive power has an outer-side surface being concave in a paraxial region thereof and an inner-side surface being convex in a paraxial region thereof, the fourth lens element has positive refractive power, at least one surface of the fourth lens element is aspheric, each of at least half of lens elements of the lens system is made of plastic material, and each of at least two lens elements of the lens system has an Abbe number smaller than 22.0.

23. The electronic device of claim 22, further comprising an aperture stop disposed on the outer side of the first lens element.

24. The electronic device of claim 22, wherein at least one surface of the four lens elements has at least one inflection point.

25. The electronic device of claim 22, wherein an Abbe number of the i-th lens element is Vdi, a temperature coefficient of refractive index of each of the lens elements is dn/dt, and the following conditions are satisfied:

$$40.0<\Sigma Vdi<150.0, \text{ wherein } i=1, 2, 3, 4; \text{ and}$$

$$-150\times10^{-6}[1/°\text{ C.}]<dn/dt<-50\times10^{-6}[1/°\text{ C.}].$$

26. The electronic device of claim 22, wherein each of at least three lens elements of the lens system has an Abbe number smaller than 26.0.

27. An electronic device comprising:
a lens system comprising four lens elements which are, in order from an outer side to an inner side, a first lens element, a second lens element, a third lens element and a fourth lens element;
wherein the first lens element has positive refractive power, the second lens element has negative refractive power, the third lens element with negative refractive power has an outer-side surface being concave in a paraxial region thereof and an inner-side surface being convex in a paraxial region thereof, the fourth lens element has positive refractive power, each of at least two lens elements of the lens system has an Abbe number smaller than 22.0, and the lens system further comprises an aperture stop disposed on the outer side of the second lens element.

28. The electronic device of claim 27, wherein each of the second lens element, the third lens element and the fourth lens element has at least one surface being aspheric, an Abbe number of the i-th lens element is Vdi, and the following condition is satisfied:

$$40.0<\Sigma Vdi<150.0, \text{ wherein } i=1, 2, 3, 4.$$

29. The electronic device of claim 27, wherein at least one fitting structure is disposed between each of adjacent lens elements of the lens system, an axial distance between an inner-side surface of the fourth lens element and a conjugate surface is BL, a focal length of the lens system is f, and the following condition is satisfied:

$$0.01<BL/f<0.50.$$

30. The electronic device of claim 27, wherein at least half of lens elements of the lens system are made of plastic material, an axial distance between an outer-side surface of the first lens element and an inner-side surface of the fourth lens element is TD, and the following condition is satisfied:

$$1.0 \text{ [mm]}<TD<5.0 \text{ [mm]}.$$

31. The electronic device of claim 27, wherein a curvature radius of an outer-side surface of the fourth lens element has the same sign as a curvature radius of an inner-side surface of the fourth lens element.

* * * * *